United States Patent [19]
Fukasawa et al.

[11] Patent Number: 5,533,012
[45] Date of Patent: Jul. 2, 1996

[54] CODE-DIVISION MULTIPLE-ACCESS SYSTEM WITH IMPROVED UTILIZATION OF UPSTREAM AND DOWNSTREAM CHANNELS

[75] Inventors: Atsushi Fukasawa; Kenji Horiguchi; Takuro Sato; Hiroki Sugimoto; Yumi Takizawa, all of Tokyo, Japan

[73] Assignee: OKI Electric Industry Co., Ltd., Tokyo, Japan

[21] Appl. No.: 401,451

[22] Filed: Mar. 9, 1995

[30] Foreign Application Priority Data

Mar. 10, 1994 [JP] Japan ................................. 6-040140

[51] Int. Cl.[6] .................................................. H04B 1/69
[52] U.S. Cl. ............................. 370/18; 370/21; 375/208; 381/29; 381/35; 455/54.1
[58] Field of Search ................................. 370/18, 19, 20, 370/21; 375/200, 205, 206, 209, 210, 245; 381/29–30, 34, 35; 395/2.21, 2.13; 455/54.1, 63, 296

[56] References Cited

U.S. PATENT DOCUMENTS

| 5,103,459 | 4/1992 | Gilhousen | 375/205 |
| 5,224,122 | 6/1993 | Bruckert | 375/200 |
| 5,329,547 | 7/1994 | Ling | 375/206 |
| 5,345,472 | 9/1994 | Lee | 375/206 |
| 5,394,434 | 2/1995 | Kawabe et al. | 375/205 |
| 5,414,699 | 5/1995 | Lee | 375/206 |
| 5,463,660 | 10/1995 | Fukasawa et al. | 375/205 |

OTHER PUBLICATIONS

Sklar, "Digital Communications", Prentice Hall, 1988, pp. 571–573.
Goodman et al, "A Robust Adaptive Quantizer", IEEE Transactions on Cummunications, Nov. 1975, pp. 1362–1365.

*Primary Examiner*—Alpus H. Hsu
*Assistant Examiner*—Ricky Ngo
*Attorney, Agent, or Firm*—Law Office of Steven M. Rabin

[57] ABSTRACT

A code-division multiple-access system has a downstream channel for transmission from a base station to a number of mobile stations, and an upstream channel for transmission from the mobile stations to the base station. On the downstream channel, each mobile station's spreading code is divided into two parts, which modulate data transmitted on in-phase and quadrature carriers, respectively, thereby enabling the length of the spreading code to be doubled without increasing the chip rate. On the upstream channel, as soon as a symbol is received from one mobile station, it is despread to estimate its value, then respread and canceled as interference with respect to the other mobile stations, these processes being iterated in a cyclic order of the mobile stations.

40 Claims, 17 Drawing Sheets

TIME (SECONDS)

CODE-DIVISION MULTIPLE-ACCESS SYSTEM WITH IMPROVED UTILIZATION OF UPSTREAM AND DOWNSTREAM CHANNELS

BACKGROUND OF THE INVENTION

The present invention relates to a wireless code-division multiple-access communication system in which multiple mobile stations communicate with a single base station, as in a cellular telephone system or personal communication system.

Code-division multiple-access (hereinafter, CDMA) is a type of spread-spectrum system that allows multiple stations to communicate over the same channel, A mobile communication system of the type described above has a single upstream channel on which all mobile stations transmit to the base station, and a single downstream channel on which the base station transmits to all the mobile stations. On each of these channels, each mobile station is assigned a different spreading code, which is used to spread that station's signal before transmission and despread the signal after reception, If the spreading codes are mutually orthogonal (if any pair of spreading codes has zero mutual correlation), and if all signals are mutually synchronized, then each mobile station's signal can be received without interference from other stations' signals.

In the upstream channel, however, synchronization of signals transmitted from different mobile stations is difficult to achieve, so these signals usually interfere with each other to some extent. This interference limits the number of mobile stations that can access the system simultaneously.

In the downstream channel synchronization is not such a problem, because all signals are transmitted by the same base station, but if there are many mobile stations, it becomes difficult to provide the necessary number of mutually orthogonal spreading codes. Very long spreading codes have to be used, with a high spreading gain (high chip rate), but this undesirably broadens the bandwidth of the downstream channel. The alternative is to employ spreading codes that are not all mutually orthogonal, accepting a certain amount of interference. In either case, the number of mobile stations that can access the system is again limited.

Although synchronization of different spreading codes presents no problem on the downstream channel, there is a problem of carrier synchronization when synchronous (coherent) detection is employed. In synchronous detection, a mobile station multiplies the received signal by a locally generated carrier signal which is synchronized in phase to the base station's carrier signal. The problem is in acquiring and maintaining phase synchronization as the mobile station moves in relation to the base station.

A further problem is that as a mobile station moves through electrically noisy areas or areas with obstructions to radio transmission, the rate of errors in the received signal inevitably rises. The signal transmitted by a mobile station is typically a voice signal that has been encoded by adaptive differential pulse-code modulation (ADPCM), using an adjustable scale factor to prevent overflow and underflow in the encoding process. Known methods of adjusting the scale factor work well at low error rates, but at high error rates they are found to produce spike noise in the received signal. Spike noise is highly obtrusive in voice communication, and seriously degrades the perceived voice quality, even if the signal-to-noise ratio is affected only slightly.

SUMMARY OF THE INVENTION

It is accordingly an object of the present invention to cancel interference occurring in the upstream channel of a CDMA mobile communication system.

Another object of the invention is to enable the use of long spreading codes in the downstream channel without increasing the bandwidth of the downstream channel.

A further object is to permit asynchronous detection in the downstream channel.

A still further object is to increase the number of mobile stations that can simultaneously access a CDMA communication system.

Yet another object is to reduce the error rate in a CDMA communication system.

Still another object is to avoid spike noise in audio signals transmitted by ADPCM encoding.

The invented code-division multiple-access communication system comprises a base-station apparatus and a mobile-station apparatus. The base-station apparatus transmits, to a plurality of mobile stations, a downstream signal in which signals for different mobile stations are spread by different downstream spreading codes, and receives from them an upstream signal in which signals from different mobile stations are spread by different upstream spreading codes.

The base-station apparatus transmits the downstream signal on two mutually orthogonal carrier signals. Each downstream spreading code is divided into two parts. Each transmitted symbol is spread by one part to modulate one carrier signal, and spread by the other part to modulate the other carrier signal.

Upon receiving a symbol from any one mobile station, the base-station apparatus despreads the upstream signal by the corresponding upstream spreading code, estimates the value of the symbol, respreads the estimated symbol value to generate an estimated interference signal, and cancels the estimated interference signal from the upstream signal so that it will not interfere with the estimation of symbol values of other mobile stations.

The processes of estimating symbol values and canceling interference are carried out for all mobile stations, in a cyclic order determined by the timing of symbol boundaries at different stations. The estimates of symbol values and interference are refined through successive iterations of this cycle as successive symbols are received.

DETAILED DESCRIPTION OF THE INVENTION

Figure 1:
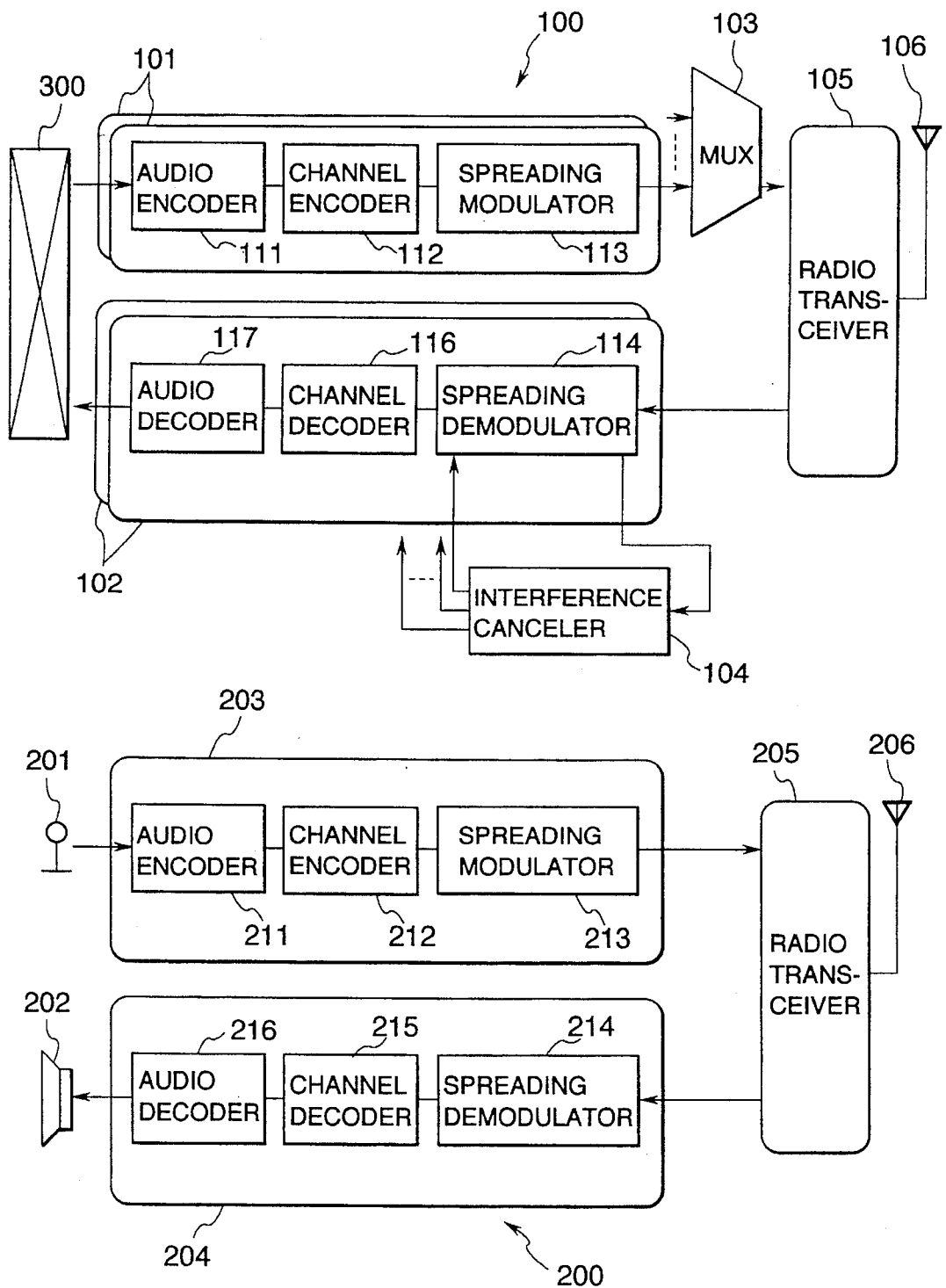
FIG. 1 is a block diagram showing the general structure of the invented communication system.

Embodiments of the invention will be described with reference to the attached illustrative drawings. First, however, it will be useful to review the principles of CDMA communication.

To transmit M data signals $ak(t)$ ($k=1, \ldots, M$) over the same frequency channel, a CDMA system modulates each data signal by a spreading code $ck(t)$. The data signal $ak(t)$ consists of symbols with duration Ta, each having a value of plus or minus one. The spreading code consists of chips with duration Tc, each also having a value of plus or minus one. The chip rate is N times the symbol rate, where N is a positive integer referred to as the spreading gain. Thus, $Ta = N \cdot Tc$, and there are N chips per symbol. Modulation is carried out by multiplication, producing a baseband signal of the form $$dk(t) = ak(t) \cdot ck(t)$$

The process is referred to as spreading. It is convenient to view time (t) as being measured in chip periods. Different spreading codes are preferably orthogonal over each symbol period, meaning that in any given symbol period:

$$\sum_{t=1}^{N} cj(t) \cdot ck(t) = 0 \text{ if } j \neq k$$

Since $ck(t)$ is plus or minus one, in any symbol period:

$$\sum_{t=1}^{N} ck(t) \cdot ck(t) = N$$

In transmission, the baseband signals $dj(t)$ of different stations are additively combined, producing a baseband signal $E(t)$ of the form:

$$E(t) = \sum_{j=1}^{M} dj(t) = \sum_{j=1}^{M} aj(t) \cdot cj(t)$$

A receiver extracts the k-th data signal by correlating this baseband signal with the k-th spreading code $ck(t)$ over each symbol period, obtaining.

$$bk = (1/N) \cdot \sum_{t=1}^{N} E(t) \cdot ck(t) = (1/N) \cdot \sum_{t=1}^{N} \sum_{j=1}^{M} aj(t) \cdot cj(t) \cdot ck(t)$$

$$= (1/N) \left[ \sum_{t=1}^{N} ak(t) \cdot ck(t) \cdot ck(t) + \sum_{\substack{j=1 \\ j \neq k}}^{M} \sum_{t=1}^{N} aj(t) \cdot cj(t) \cdot ck(t) \right]$$

$$= ak(t) + (1/N) \cdot \sum_{j \neq k} \sum_{t=1}^{N} aj(t) \cdot cj(t) \cdot ck(t)$$

This process is referred to as despreading. The last term in the above equation is an interference term. If the spreading codes are orthogonal and the data signals are all synchronized, so that the $aj(t)$ and $ak(t)$ are all constant over the symbol period from $t=1$ to N, the interference will be zero, and bk will equal $ak(t)$, as desired.

Even without synchronization and orthogonality, products of the form $aj(t) \cdot cj(t) \cdot ck(t)$ (where $j \neq k$) will tend to take on values of plus and minus one with equal probability, averaging out to a value near zero. The size of the interference term in this case will tend to decrease with increasing values of N, but to increase with increasing values of M.

CDMA is a type of spread-spectrum communication. The bandwidth needed to transmit the original data signal $ak(t)$ is proportional to the symbol rate 1/Ta, while the bandwidth needed to transmit the spread signal $ak(t) \cdot ck(t)$ is proportional to the chip rate 1/Tc. Spreading the signal thus widens its frequency spectrum by a factor equal to the spreading gain N.

First embodiment

FIG. 1 is a block diagram showing the base-station apparatus 100 and mobile-station mobile-station apparatus 200 of a first embodiment of the invention. The base-station apparatus 100 is coupled via telephone lines to a central-office switching system 300 in a telephone network. A separate mobile-station apparatus 200 is provided at each mobile station.

The base-station apparatus 100 comprises a plurality of transmit processors 101, a like plurality of receive processors 102, a multiplexer 103, an interference canceler 104, a radio transceiver 105, and an antenna 106. A separate transmit processor 101 and receive processor 102 are provided for each mobile station. The multiplexer 103 multiplexes the outputs of the transmit processors 101 and supplies them to the radio transceiver 105 for transmission as a single downstream signal to all of the mobile stations. The radio transceiver 105 also receives an upstream signal combining signals transmitted from all of the mobile stations, and furnishes this upstream signal to at least one of the receive processors 102 for demodulation to an upstream received baseband signal. The interference canceler 104 takes the upstream received baseband signal from this receive processor 102, cancels interference between different stations, and distributes output signals with interference thus canceled to all of the receive processors 102.

Each transmit processor 101 comprises an audio encoder 11, a channel encoder 112, and a spreading modulator 113. Each receive processor 102 comprises a spreading demodulator 114, a channel decoder 116, and an audio decoder 117.

The mobile-station apparatus 200 comprises a transmitter microphone 201, a receiver 202, a transmit processor 203, a receive processor 204, a radio transceiver 205, and an antenna 206. The transmit processor 203 comprises an audio encoder 211, a channel encoder 212, and a spreading modulator 213. The receive processor 204 comprises a spreading demodulator 214, a channel decoder 215, and an audio decoder 216.

The transmit processor 203 generates a transmit signal which the radio transceiver 205 transmits from the antenna 206 to antenna 106 of the base station as part of the upstream signal. The radio transceiver 205 also receives the downstream signal from the base station and supplies it to the receive processor 204. The upstream signal and downstream signal have different carrier frequencies, to prevent interference between the upstream and downstream channels.

The transmitter microphone 201 converts audio input such as voice input to an analog electrical signal, and the receiver 202 converts an analog electrical signal to audio output. The transmit and receive processors 203 and 204 are primarily digital circuits, so there is an analog-to-digital (A/D) converter between the transmitter microphone 201 and transmit processor 203, and a digital-to-analog (D/A) converter between the receive processor 204 and receiver 202. These converters have been omitted to simplify the drawing. Similar A/D and D/A converters may be present in the base-station apparatus, between the transmit and receive processors 101 and 102 and the telephone network.

Also omitted from the drawings are control circuits for assigning an upstream spreading code and a downstream spreading code to each mobile station and performing other well-known functions such as synchronization functions. The downstream spreading codes are mutually orthogonal codes such as Walsh-Hadamard codes with a repeating length N equal to the symbol length, so that the entire code is used to spread each symbol. The length N of each spreading code is preferably a power of two. The upstream spreading codes are, for example, pseudo-random noise codes (PN codes) with a repeating length which need not equal the symbol length and may indeed be much longer than the symbol length.

The audio encoders 111 and 211 compressively encode digitized audio signals to produce ADPCM signals. The audio decoders 117 and 216 expand compressed ADPCM signals to produce digitized audio signals. These encoders and decoders have novel features for scale-factor control, as will be described later. The channel encoders 112 and 212 perform conventional processes such as block encoding and convolutional encoding, thereby producing symbols to be transmitted. The channel decoders 116 and 215 perform the reverse processes, providing a certain degree of error-correcting capability.

Figure 2:
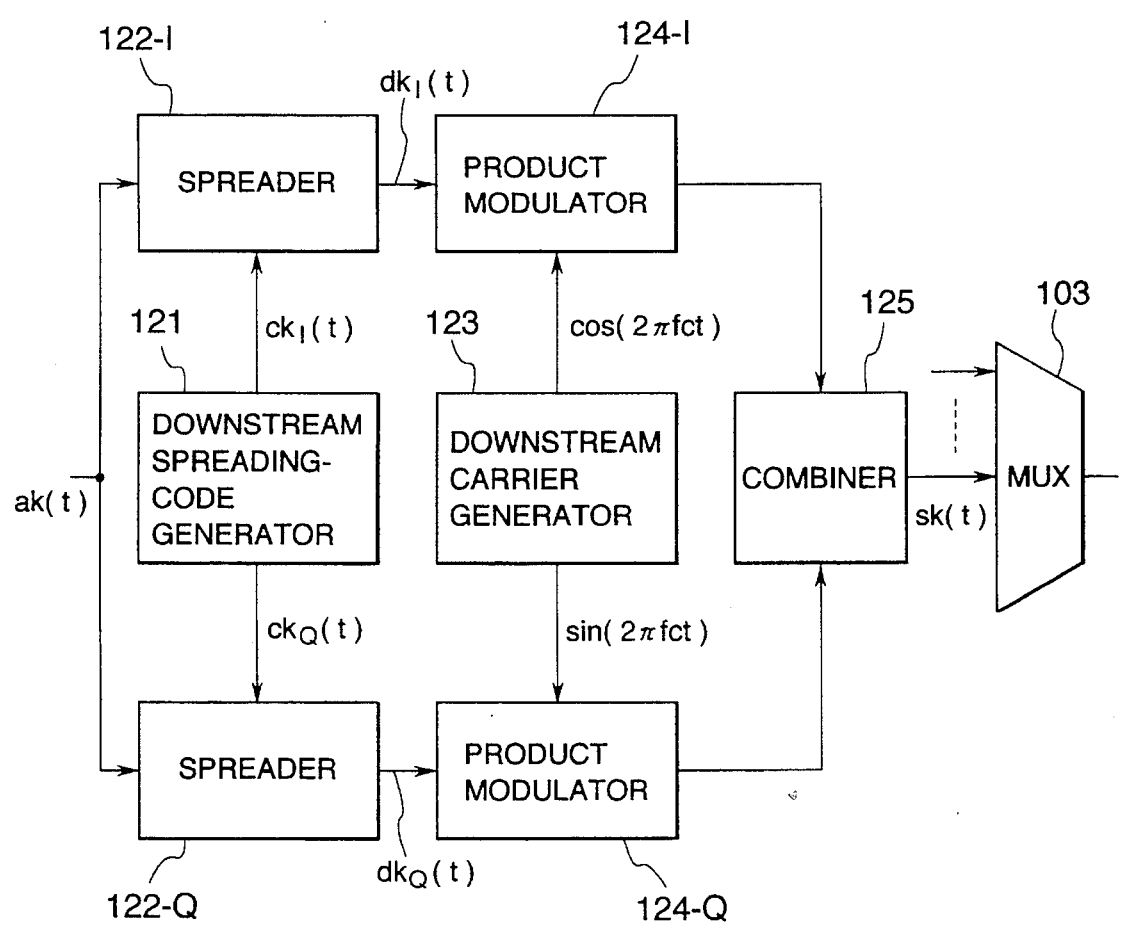
FIG. 2 is a block diagram of the base-station spreading modulator in a first embodiment of the invention.

The spreading modulators 113 and 213 spread the symbols output by the channel encoders 112 and 212 to produce baseband transmit signals, with which they modulate a carrier signal. The spreading demodulators 114 and 214 perform the reverse function, extracting the symbols transmitted by a particular station from a received signal. The spreading demodulators 114 in the base-station apparatus 100 are assisted by the interference canceler 104, which cancels interference between different mobile stations, thereby reducing the error rate. Novel features are present in the spreading modulators 113 in the base-station apparatus 100, and in the spreading demodulators 213 and interference canceler 104 in the mobile-station apparatus 200. Base-station spreading modulators FIG. 2 shows the structure of a base-station spreading modulator 113, which comprises a downstream spreading-code generator 121, spreaders 122-I and 122-Q, a downstream carrier generator 123, product modulators 124-I and 124-Q, and a combiner 125. Spreaders 122-I and 122-Q are identical in structure. Similarly, product modulators 124-I and 124-Q are identical in structure. The letter k that appears in signal names in this drawing denotes the k-th mobile station. For example, ak(t) is the transmit data to be transmitted to the k-th mobile station.

The downstream spreading-code generator 121 generates the downstream spreading code ck(t) assigned to the k-th mobile station, and divides it into two parts, thus producing two partial spreading codes which will be denoted $ck_I(t)$ and $ck_Q(t)$. The dividing can be done in any convenient way: for example, chips in ck(t) can be assigned alternately to $ck_I(t)$ and $ck_Q(t)$. The partial spreading codes $ck_I(t)$ and $ck_Q(t)$ have chip rates of N/2, comprising N/2 chips per symbol. The spreading-code generator 121 supplies partial spreading code $ck_I(t)$ to spreader 122-I, and partial spreading code $ck_Q(t)$ to spreader 122-Q.

Identical transmit data ak(t) are input to both spreaders 122-I and 122-Q. Spreader 122-I spreads the transmit data ak(t) by multiplication with partial spreading code $ck_I(t)$, and provides the resulting spread signal $dk_I(t)$ to product modulator 124-I. Similarly, spreader 122-Q spreads transmit data ak(t) by multiplication with partial spreading code $ck_Q(t)$ and inputs the resulting spread signal $dk_Q(t)$ to product modulator 124-Q. Spread signals $dk_I(t)$ and $dk_Q(t)$ are accordingly given by the following equations.

$$dk_I(t)=ak(t)\cdot ck_I(t)$$

$$dk_Q(t)=ak(t)\cdot ck_Q(t)$$

The downstream carrier generator 123 generates two mutually orthogonal carrier signals $\cos(2\pi fct)$ and $\sin(2\pi fct)$ having a certain carrier frequency fc, and provides them to product modulator 124-I and product modulator 124-Q, respectively. Carrier signal $\cos 2\pi fct$ is referred to as the in-phase (I) carrier, and carrier signal $\sin 2\pi fct$ as the quadrature (Q) carrier.

Product modulator 124-I, modulates the in-phase carrier $\cos(2\pi fct)$ by multiplication with spread signal $dk_I(t)$, and sends the resulting signal to the combiner 125. Similarly product modulator 124-Q modulates the quadrature carrier $\sin(2\pi fct)$ by spread signal $dk_Q(t)$, and sends the resulting signal to the combiner 125.

The combiner 125 additively combines the signals output by the product modulators 124-I and 124-Q to create a transmit signal sk(t), which is supplied to the multiplexer 103. The transmit signal sk(t) can be expressed by the following equation.

$$sk(t)=dk_I(t)\cos(2\pi fct)+dk_Q(t)\sin(2\pi fct)$$

The multiplexer 103 additively multiplexes this transmit signal sk(t) with similar transmit signals from the other transmit processors 101, and supplies the resulting multiplexed signal to the radio transceiver 105 in FIG. 1. The radio transceiver amplifies the multiplexed signal for transmission from the antenna 106. Alternatively, the radio transceiver uses the multiplexed signal to modulate a higher-frequency carrier signal for transmission from the antenna 106.

The carrier signals $\cos(2\pi fct)$ and $\sin(2\pi fct)$ in the transmit signals fed to the multiplexer 103 are all mutually synchronized. The base-station apparatus 100 is preferably configured so that a single downstream carrier generator 123 supplies identical carrier signals $\cos(2\pi fct)$ and $\sin(2\pi fct)$ to the product modulators in all the transmit processors 101.

Although different downstream spreading codes are used in different transmit processors 101, the spreading codes are all synchronized. That is, symbol boundaries occur simultaneously in all the transmit processors.

Mobile-station spreading demodulator

Figure 3:
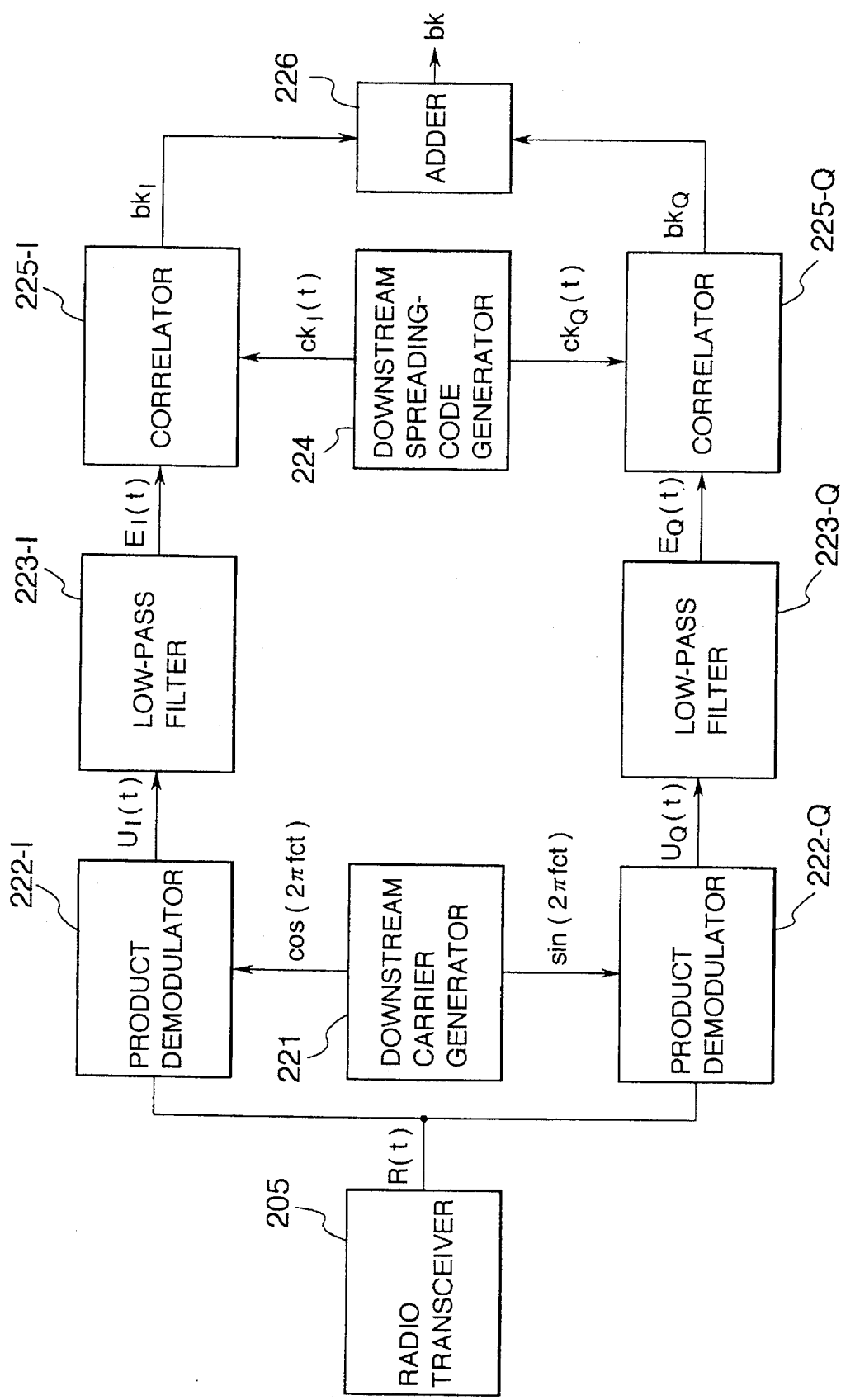
FIG. 3 is a block diagram of the mobile-station spreading demodulator in the first embodiment.

FIG. 3 shows the structure of the spreading demodulator 214 in the k-th mobile station. The spreading demodulator 214 comprises a downstream carrier generator 221, product demodulators 222-I and 222-Q, low-pass filters 223-I and 223-Q, a downstream spreading-code generator 224, correlators 225-I and 225-Q, and an adder 226. The product demodulators 222-I and 222-Q have the same structure, the low-pass filters 223-I and 223-Q have the same structure, and the correlators 225-I and 225-Q have the same structure.

The radio transceiver 205 provides the spreading demodulator 214 with a received downstream signal R(t) that can be expressed by the following equation, in which M is the number of mobile stations, and the si(t) are the transmit signals described above.

$$R(t) = \sum_{i=1}^{M} si(t)$$

This received signal R(t) is input to both product demodulators 222-I and 222-Q.

The downstream carrier generator 221 generates two mutually orthogonal carrier signals $\cos(2\pi fct)$ and $\sin(2\pi fct)$, which are synchronized with the corresponding carrier signals in the base-station apparatus 100. These two carrier signals are supplied to product demodulators 222-I and 222-Q, respectively.

Product demodulator 222-I multiplies the received signal R(t) by carrier signal $\cos(2\pi fct)$, and sends the resulting product signal $U_I(t)$ to low-pass filter 223-I. Similarly, product demodulator 222-Q multiplies the received signal R(t) by carrier signal $\sin(2\pi fct)$, and sends the resulting product signal $U_Q(t)$ to low-pass filter 223-Q. The product signals $U_I(t)$ and $U_Q(t)$ are expressed by the following equations.

$$U_I(t) = R(t)\cos(2\pi fct)$$

$$U_Q(t) = R(t)\sin(2\pi fct)$$

From $U_I(t)$, low-pass filter 223-I extracts the baseband signal $E_I(t)$ carried on the in-phase carrier component, and supplies it to correlator 225-I. Similarly, low-pass filter 225-Q extracts the baseband signal $E_Q(t)$ carried on the quadrature carrier component from $U_Q(t)$, and supplies it to correlator 225-Q.

The downstream spreading-code generator 224 generates the k-th mobile station's downstream spreading code ck(t), in synchronization with the spreading-code generator at the base station, and divides it into the same two partial spreading codes $ck_I(t)$ and $ck_Q(t)$. These partial spreading codes $ck_I(t)$ and $ck_Q(t)$ are provided to correlators 225-I and 225-Q, respectively.

Correlator 225-I correlates baseband signal $E_I(t)$ with partial spreading code $ck_I(t)$, and supplies the resulting correlation value $bk_I(t)$ to the adder 226. Similarly, correlator 225-Q correlates baseband signal $E_Q(t)$ with partial spreading code $ck_Q(t)$, and supplies the resulting correlation value $bk_Q(t)$ to the adder 226. The correlation values $bk_I(t)$ and $bk_Q(t)$ can be expressed by the following equations.

$$bk_I = (1/2Ta) \int_{t=0}^{Ta} E_I(t) \cdot ck_I(t)dt = (1/N) \cdot \sum_{t=1}^{N/2} E_I(t) \cdot ck_I(t)$$

$$bk_Q = (1/2Ta) \int_{t=0}^{Ta} E_Q(t) \cdot ck_Q(t)dt = (1/N) \cdot \sum_{t=1}^{N/2} E_Q(t) \cdot ck_Q(t)$$

The adder 226 adds the correlation values $bk_I$ and $bk_Q$ output from the correlators 225-I and 225-Q, and supplies their sum bk to the channel decoder 215 as an estimated value of the received data. The sum bk is expressed by the following equation (14).

$$bk = bk_I + bk_Q = (1/N) \cdot \left[ \sum_{t=1}^{N/2} E_I(t)ck_I(t) + \sum_{t=1}^{N/2} E_Q(t)ck_Q(t) \right]$$

This sum bk is the same value as would have been obtained by spreading the transmit data ak(t) by the spreading code ck(t) at the base station to produce a single baseband signal, transmitting it on a single carrier wave, and correlating the received baseband signal with ck(t) at the mobile station. If mutually orthogonal spreading codes are used for different mobile stations, bk will be equal to the transmit data ak(t).

The bandwidth required for the downstream channel is proportional to the chip rate of the baseband signal, which is the symbol rate of the transmit data ak(t) multiplied by the spreading rate N/2. The effect of the novel spreading modulator 113 and spreading demodulator 214 is that a spreading code of length N can be employed within the bandwidth conventionally used for a spreading code of length N/2. This doubles the available number of mutually orthogonal spreading codes, permitting a larger number of mobile stations to access the base station simultaneously. The invention accordingly offers a way to serve more mobile stations without increasing the bandwidth of the downstream channel.

Mobile-station spreading modulator

Quadrature modulation (two orthogonal carrier signals) can be employed on the upstream channel as well as the downstream channel. In this case the mobile-station spreading modulator 213 is similar in structure to the base-station spreading modulators 113, except that the upstream spreading codes of different mobile stations are only approximately orthogonal, and the symbol boundaries of different mobile stations are not synchronized.

It is possible to employ only a single carrier signal on the upstream channel, in which case the spreading modulator 213 requires only a single spreader, a single product modulator, and no combiner.

Base-station spreading demodulator

If quadrature modulation is employed on the upstream channel, then one of the base-station spreading demodulators 114 has, for example, the same general structure as the mobile-station spreading demodulator 214 shown in FIG. 3, with the substitution of upstream carrier and spreading-code generators for the downstream carrier and spreading-code generators of FIG. 3. This is the spreading demodulator 114 that supplies a baseband signal to the interference canceler 104.

The following description will use the same reference numerals and other symbols as in FIG. 3 to refer to parts of this spreading demodulator 114, omitting the I and Q suffixes. For example, ci(t) will now denote the upstream spreading code. If only a single carrier signal is employed, then only a single product demodulator 222, low-pass filter, and correlator 225 are required in this spreading demodulator 114, and no adder 226 is required.

The other base-station spreading demodulators 114 are not called upon to supply baseband signals to the interference canceler 104, so they do not require a carrier generator 221, product demodulators 222, or low-pass filters 223. Moreover, depending on the type of output furnished by the interference canceler 104, these other spreading demodulators 114 may not be necessary at all, as will be explained later.

Interference canceler

Figure 4:
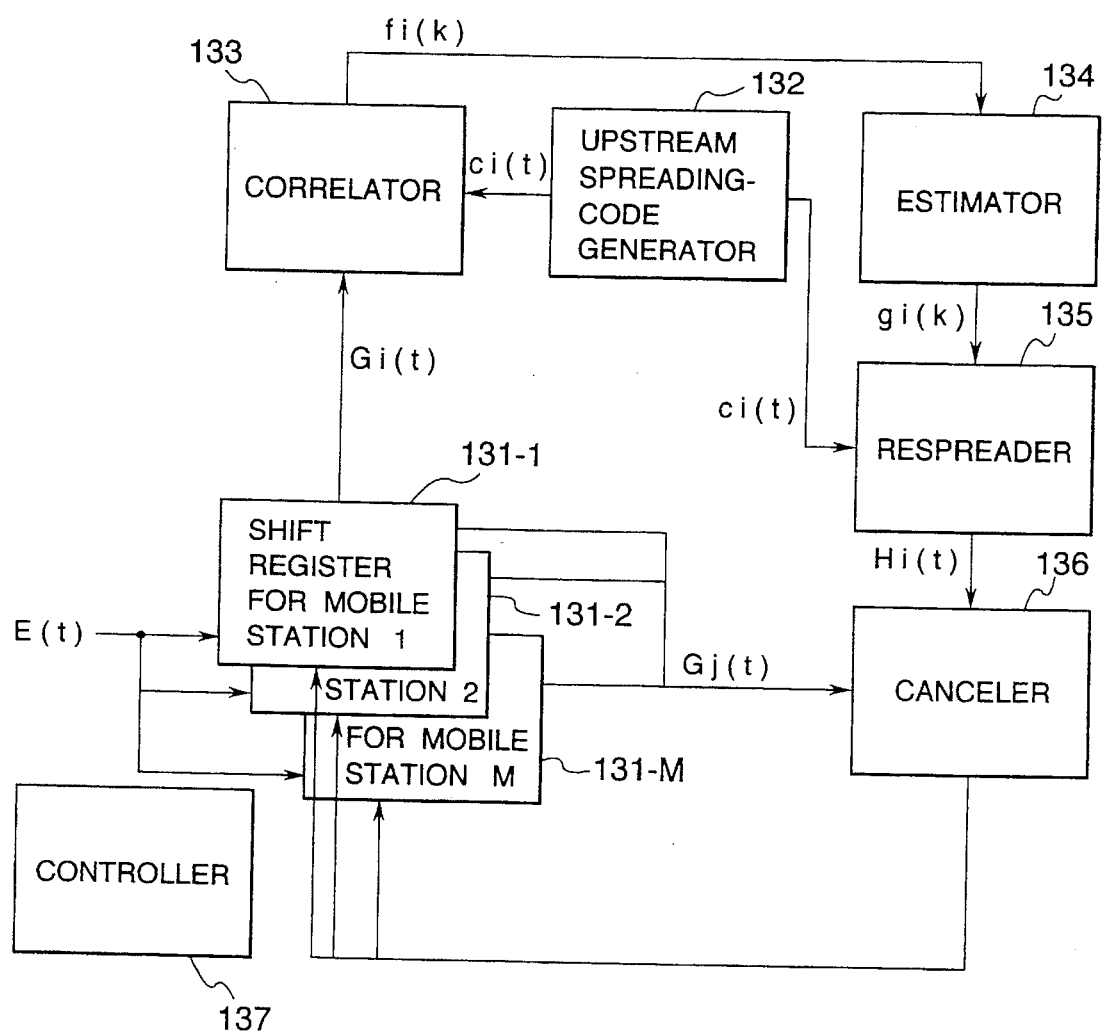
FIG. 4 is a block diagram of the interference canceler in the first embodiment.

FIG. 4 is a block diagram showing the structure of the interference canceler 104.

The interference canceler 104 has a plurality of shift registers 131-1 to 131-M, an upstream spreading-code generator 132, a correlator 133, an estimator 134, a respreader 135, a canceler 136, and a controller 137. The shift registers 131-1 to 131-M correspond to different mobile stations. Each stores N·K chips, where N is the spreading gain and K is an integer greater than unity, which will be referred to as the number of stages. (In this embodiment K=9). The stored chip data are shifted to the right in each shift register as new chip data arrive.

The controller 137 controls the operations of the other elements in FIG. 4 through signal lines (not explicitly drawn). One of the functions of the controller 137 is to establish synchronization with the different mobile stations, so that it can recognize symbol boundaries. Synchronization is established separately with each mobile station; the mobile stations need not be synchronized with each other.

The interference canceler 104 receives a baseband signal E(t) from one of the spreading demodulators 114 in the base-station apparatus 100. If quadrature modulation is used on the upstream channel, there are two baseband signals $E_I(t)$ and $E_Q(t)$, output from respective low-pass filters, and chips are received two at a time. In this case E(t) comprises all the chips of $E_I(t)$ and $E_Q(t)$, taken alternately from $E_I(t)$ and $E_Q(t)$.

The operation of the interference canceler 104 will be described with reference to the flowchart in FIG. 5.

Figure 5:
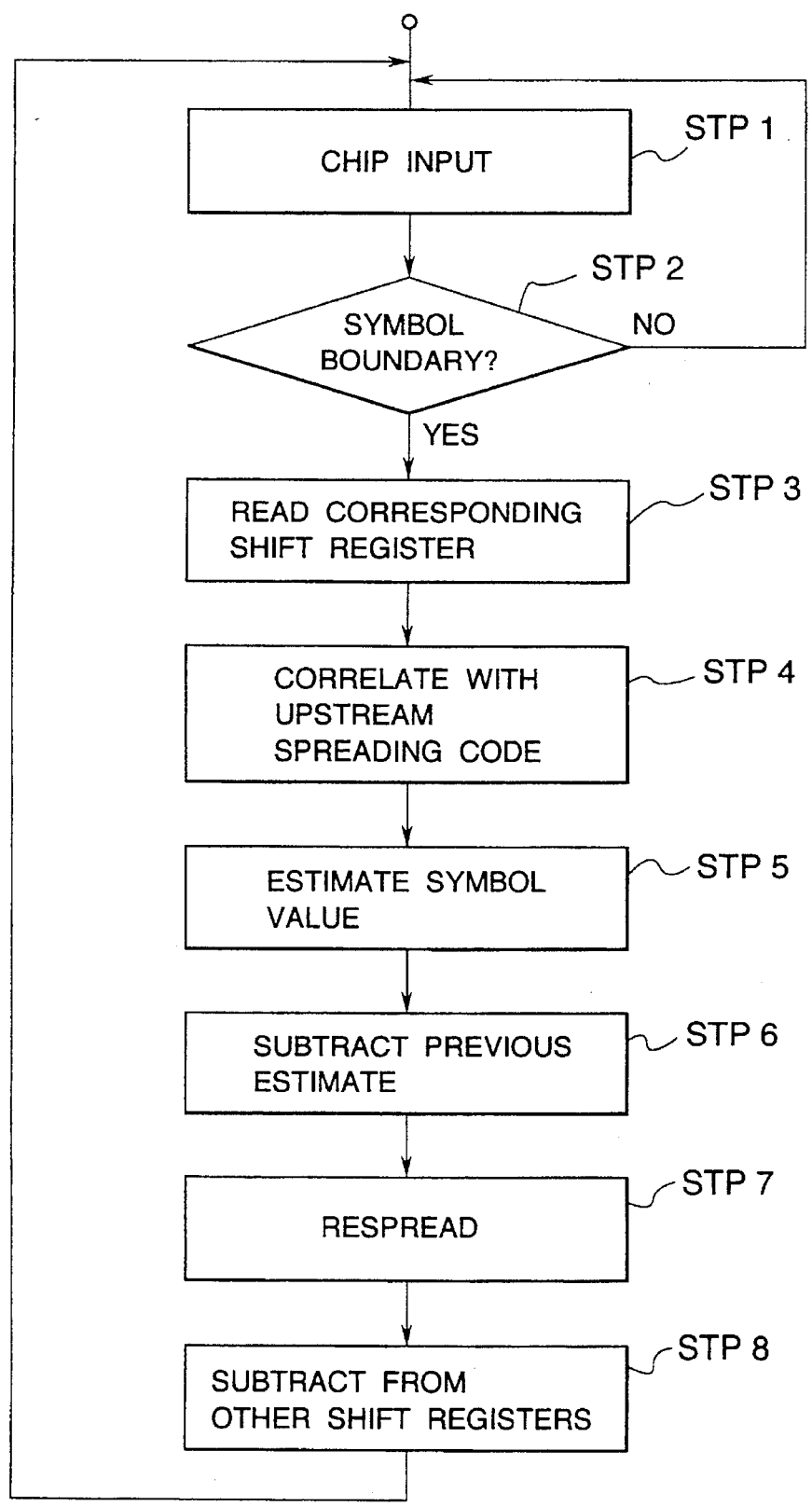
FIG. 5 is a flowchart describing the operation of the interference canceler in the first embodiment.

The chip data of E(t) are input to the shift registers 131-1, . . . , 131-M (step STP1 in FIG. 5). The input is one chip at a time in the case of single-carrier modulation, or two chips at a time if quadrature modulation is employed. Identical chip values are input to all the shift registers 131-1, . . . , 131-M.

In the next step (STP2), the controller 137 waits until it recognizes a symbol boundary. At this point the shift registers contain chip data for K complete symbol periods of one mobile station, referred to below as the i-th station. The controller 137 now reads the entire contents of the corresponding shift register 131-i, comprising data for K complete symbols, into the correlator 133 (step STP3). The chip data thus read are denoted Gi(t) in FIG. 4.

If two mobile stations i and j reach symbol boundaries simultaneously, they are designated in turn according to a fixed rule, such as lowest-numbered station first. Thus the mobile stations are processed in a regular cyclic order, and as a particular symbol is shifted through the shift registers, its station will be processed K times.

By an inner-product calculation, the correlator 133 calculates the correlation between the chip data Gi(t) in the i-th shift register 131-i and the upstream spreading code ci(t) of the i-th station, which is output from the spreading-code generator 132, thereby despreading the chip data (step STP4 in FIG. 5). The correlation value fi(k) of the k-th symbol in the shift register is given by the following equation.

$$fi(k) = (1/N) \cdot \sum_{t=kN+1}^{kN+N} Gi(t) \cdot ci(t)$$

In this embodiment the parameter k ranges from zero to K−1 (eight). The K symbol correlation values fi(k) (k=0, . . . , K−1) are supplied to the estimator 134.

In step STP5, the estimator 134 carries out a correction that converts each symbol correlation value fi(k) to an estimated symbol value gi(k). Examples of several useful corrections are shown in the equations below. The first equation limits the symbol correlation values fi(k) to a maximum absolute value of n, where n is a suitable parameter such as a real number near unity. The second equation pulls the estimated symbol values toward plus or minus one by a square-root calculation. The third equation (18) limits the estimated symbols values to a maximum absolute value of n after multiplication by a constant α.

$$gi(k) = \begin{cases} n \cdot \text{sign}(fi(k)) & (|fi(k)| \geq n) \\ fi(n) & (|fi(k)| < n) \end{cases}$$

$$gi(k) = \text{sign}(fi(k)) \cdot \text{sqrt}(|fi(k)|)$$

$$gi(k) = \begin{cases} n \cdot \text{sign}(fi(k)) & (|\alpha \cdot fi(k)| \geq n) \\ \alpha \cdot fi(k) & (|\alpha \cdot fi(k)| < n) \end{cases}$$

In these equations, || expresses the absolute value, sign() expresses the numerical sign ±1, and sqrt is the square-root function. All of these corrections have been found to improve the final estimated symbol values gi(K−1), and any one of them can be used. Moreover, the invention is not limited to these particular corrections, and can indeed be practiced with no correction at all, using gi(k)=fi(k).

The estimated symbol values gi(k) are estimates of the symbol data ai(t) transmitted by the i-th station, representing the desired data for the i-th station and interference for other stations.

The estimator 134 retains a copy of the estimates it made for the same symbols the previous time the i-th station was processed, and outputs to the respreader 135 both its current estimates gi(k) and these previous estimates. For the first symbol (k=0), there was no previous estimate, so the previous estimated value is zero.

The respreader 135 calculates, for each symbol, the difference hi(k) between the current estimated symbol value gi(k) and the previous estimated value of the same symbol (step STP6).

Next, the respreader 135 multiplies these estimated symbol difference values hi(k) by the spreading code ci(t) of the i-th station, which it receives from the spreading-code generator 135 (step STP7), and outputs the resulting respread chip data H(i) to the canceler 136. The respread chip data Hi(t) are given by the following equation.

$$Hi(t) = hi(k) \cdot ci(t)$$

The parameters t and k are related in the obvious way, k remaining constant as t ranges over one symbol interval. For the first symbol (k=0), Hi(t) is an initial estimate of the interference caused by the i-th station's transmitted signal in the signals of other stations. For other symbols (k>0), Hi(t) is an estimate of interference that has not been canceled yet.

In the next step (STP 8), the canceler 136 updates the contents of all shift registers other than the i-th by subtracting the estimated interference signal Hi(t). For each other station j (j≠i), it reads all the data Gj(t) from the corresponding shift register 131-j, subtracts Hi(t), and writes the result back into shift register 131-j, thus performing the following operation:

$$Gj(t) \leftarrow Gj(t) - Hi(t)$$

Figure 6:
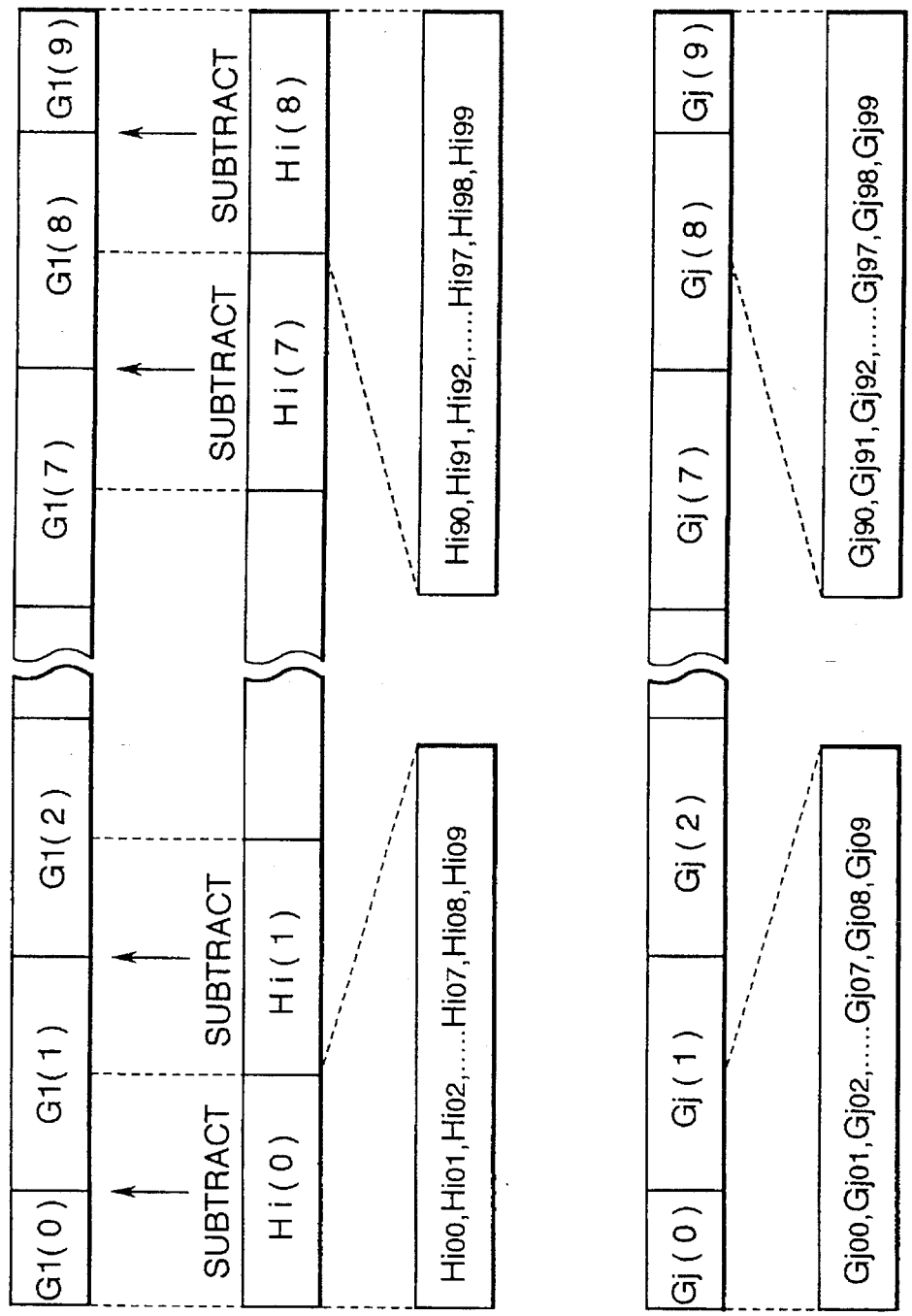
FIG. 6 is a data diagram describing the operation of the interference canceler in the first embodiment.

This interference-canceling operation is further illustrated in FIG. 6, which shows the estimated chip data G1(t) and Gj(t) of the first and j-th stations being updated by the estimated interference signal Hi(t) of the i-th station.

In FIG. 6 the notation has been slightly altered. Hi(O) represents the N chip values $Hi_{90}$ to $Hi_{09}$ obtained by respreading the first estimated symbol difference value hi(0), and Hi(8) represents the respread values $Hi_{90}$ to $Hi_{99}$ of the last estimated symbol difference value hi(8). For notational convenience, N is ten in this drawing. G1(0) to G1(9) represent the received and modified chip data of ten symbols transmitted by the first mobile station. The symbol boundaries of the first and i-th mobile stations are not aligned, so the first symbol Gi(0) of the first station has not been completely received yet. Gj(0) to Gj(9) represent similar symbols for a j-th station which, by coincidence, is aligned with the first station. $Gj_{00}$ to $Gj_{99}$ are the estimated chip values of these symbols.

The canceler 136 subtracts the estimated interference signal values $Hi_{00}$ to $Hi_{99}$ of the i-th mobile station from the corresponding values $Gj_{00}$ to $Gj_{99}$ in shift register 131-j, thereby updating shift register 131-j. It also subtracts $Hi_{00}$ to $Hi_{99}$ from similar values $G1_{00}$ to $G1_{99}$ (not explicitly shown) in the first shift register 131-1. The first-symbol interference Hi(O) is thus subtracted in part from the symbol G1(0) currently being received, and in part from the preceding symbol G1(1). Similarly, Hi(1) is subtracted from parts of G1(1) and G1(2).

Canceling of interference from symbol Gi(0) thus begins even before all chips of this symbol have been received. By the time the symbol G1(0) has been completely received, interference will have been canceled from it M−1 times, once each for the second to M-th mobile stations. By the time this symbol reaches the right end the shift register 131-1, interference will have been canceled (M−1)·K times.

Similarly, the estimated chip data Gi(8) of last symbol of the i-th mobile station, which is disposed in the last stage of shift register 131-i, have been updated (M−1)·K times to cancel interference from other stations. These repeated interference cancellations tend to make Gi(8) substantially equal to the actual baseband signal di(t) of the i-th mobile station: after the estimated interference from other stations has been repeatedly canceled away, little or nothing is left in shift register 131-i except the signal transmitted by the i-th mobile station.

As the output of the interference canceler 104, when the i-th station is processed, it is possible to take the last-stage chip data Gi(8) in shift register 131-i, the corresponding final correlation value fi(8), or the final estimated symbol value gi(8). If the last-stage chip data Gi(8) are used, they are input to a correlator or pair of correlators in the spreading demodulator 114 in the i-th receive processor 102, corresponding to the correlators 225-I and 225-Q in FIG. 3.

If the correlation value fi(8) or estimated symbol value gi(8) is taken as output of the interference canceler 104, it can be input directly the i-th channel decoder 116 in FIG. 1. In this case only one of the receive processors 102 requires a spreading demodulator 114, and the function of this spreading demodulator is reduced to demodulating the received signal R(t) to produce the baseband signal E(t).

Figure 7:
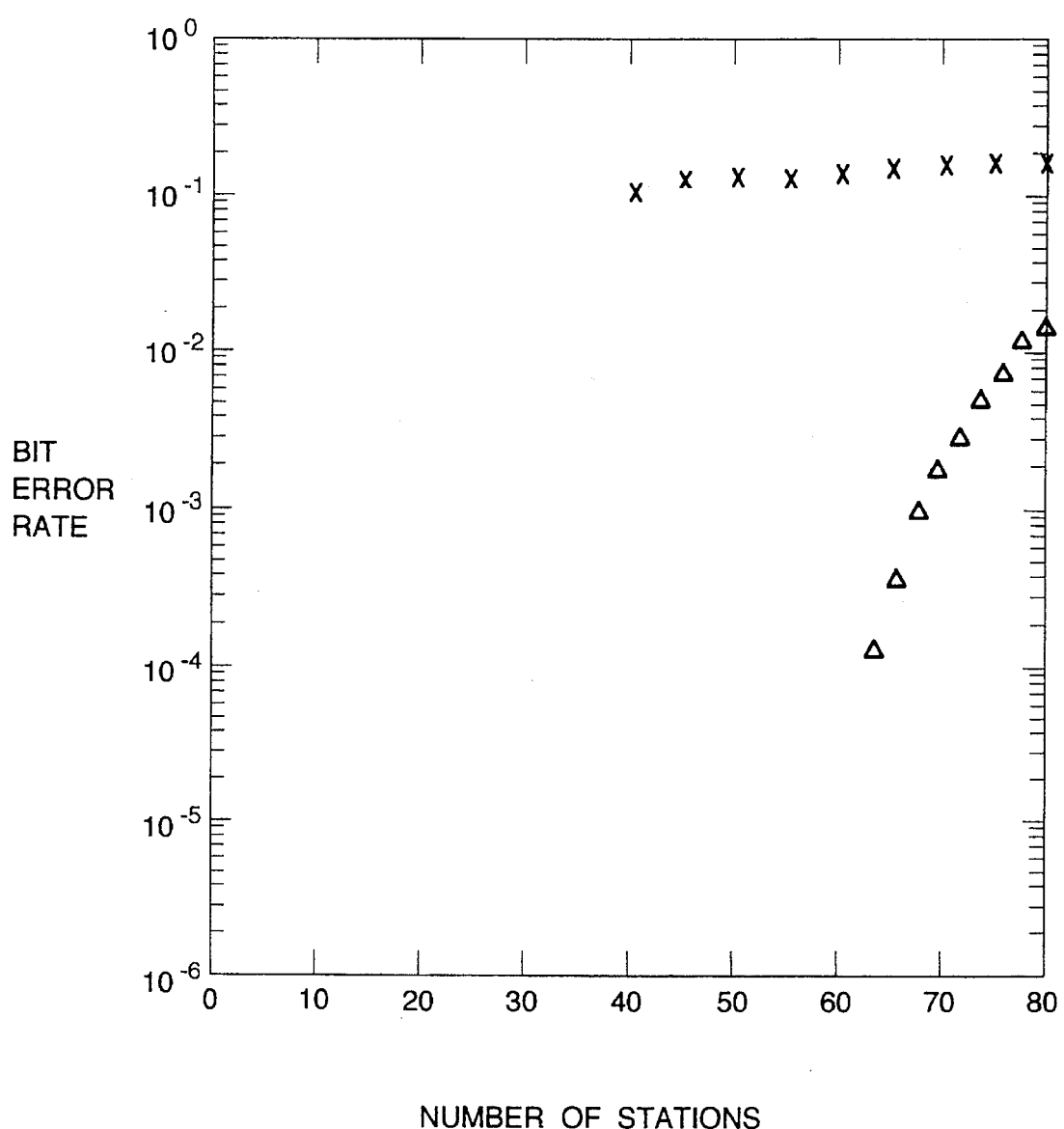
FIG. 7 is a bit-error-rate diagram showing the effect of the interference canceler in the first embodiment.

FIG. 7 shows the result of a computer simulation that evaluated errors due to interference between mobile stations when pseudo-random noise codes (PN codes) were used as the spreading codes on the upstream channel in the first embodiment. The number of mobile stations is indicated on the horizontal axis, and the bit error rate on the vertical axis. The Δ symbols are the error rate when the interference canceler 104 was used. The X symbols are the error rate in the prior art (demodulation by correlation with the spreading code only).

The interference canceler 104 greatly reduces the error rate. If an acceptable bit error rate is $10^{-3}$, for example the interference canceler 104 permits over sixty mobile stations to transmit simultaneously, at a bit error rate substantially two orders of magnitude lower than in the prior art. In general, for a given acceptable bit error rate, the interference canceler 104 enables the base station to serve more mobile stations, and for a given number of mobile stations, the interference canceler 104 reduces the error rate.

In this simulation, the spreading codes were 42nd-degree PN codes (with a repeating cycle of $2^{42}-1$) the spreading gain N was sixty-four, the transmitted data were a ninth-degree PN sequence (with a repeating cycle of five hundred eleven), the estimator 134 performed a limit correction with a limit value n of unity, and the only noise was interference from other stations.

In this embodiment the same received baseband signal E(t) was input to all shift registers 131-1 to 131-M, but this is not a restriction. The interference canceler 104 can be employed in a system that demodulates the received signal with the spreading codes of different mobile stations at an intermediate-frequency level, and inputs differing baseband signals to respective shift registers 131-1. For example, the radio transceiver 105 can be configured to distribute an intermediate-frequency received signal to all of the spreading demodulators 114, each of which demodulates the received signal in this way.

Audio encoders and decoders

Figure 8:
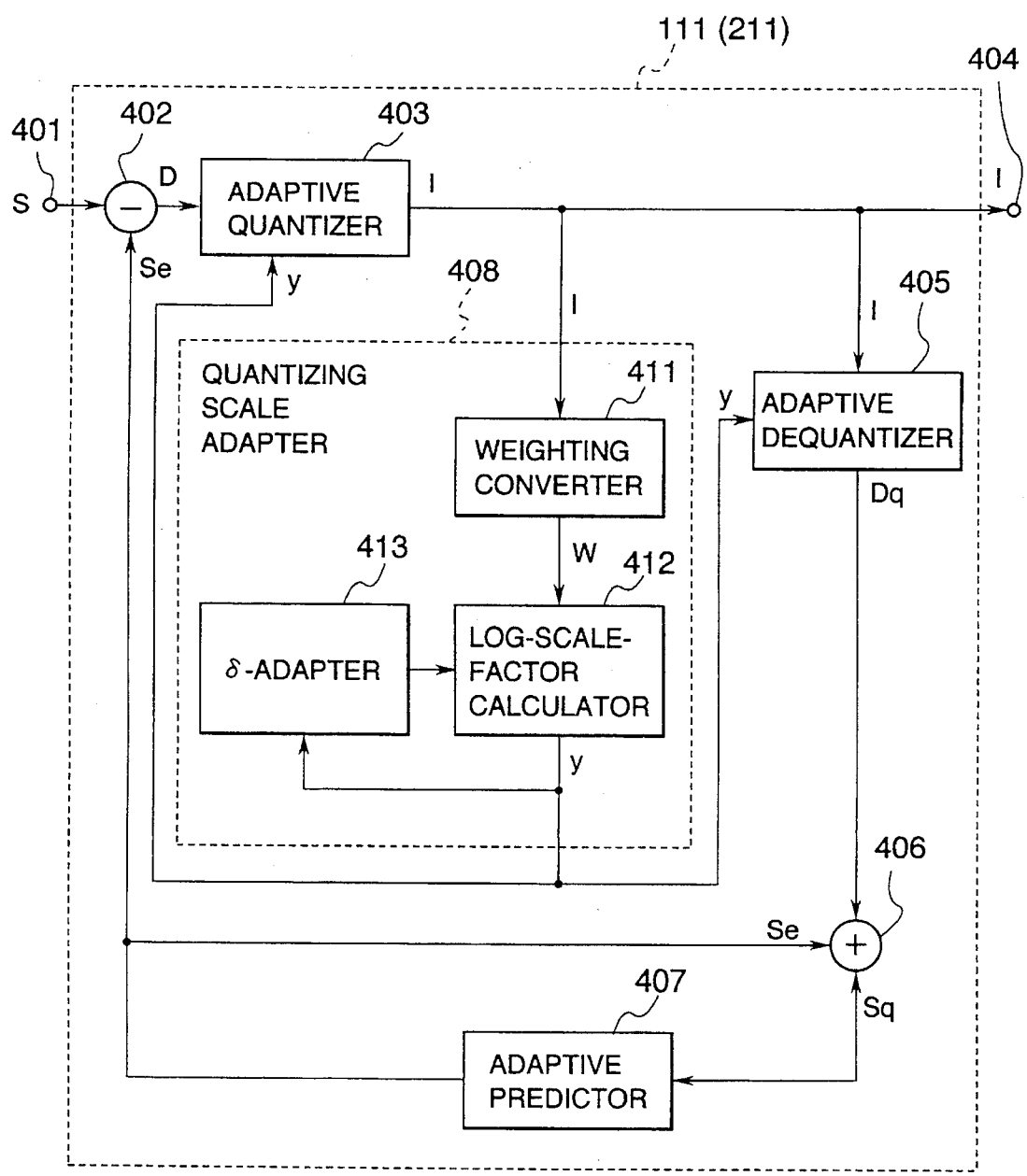
FIG. 8 is a block diagram of the audio encoders employed at the base station and mobile stations.
Figure 9:
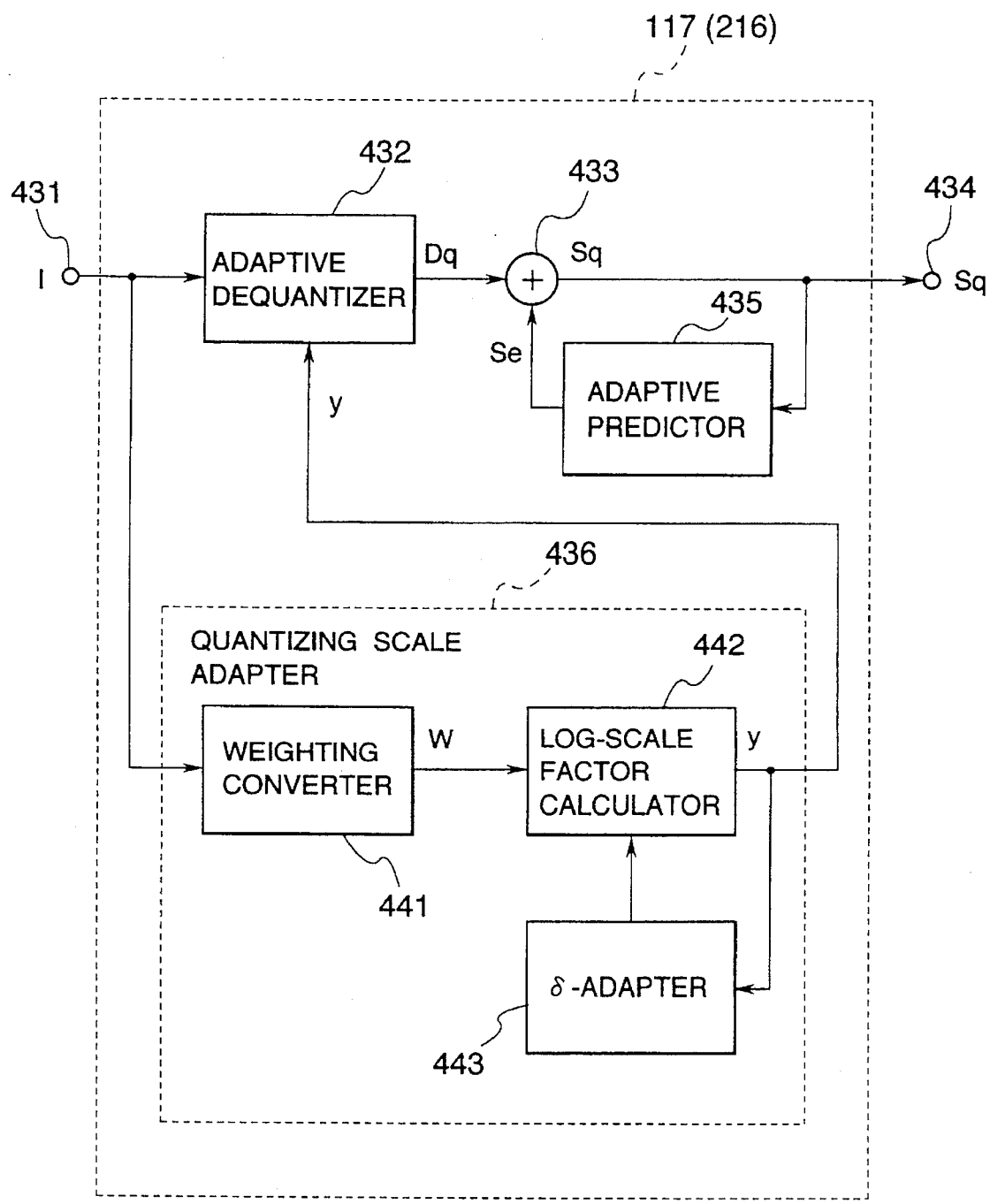
FIG. 9 is a block diagram of the audio decoders employed at the base station and mobile stations.

FIG. 8 shows the structure of the audio encoders 111 and 211; FIG. 9 shows the structure of the audio decoders 117 and 216. These perform ADPCM encoding and decoding, so before their structure is described, a brief description of conventional ADPCM encoding and decoding is in order.

In ADPCM the audio signal is sampled at a certain rate, the value of the next sample is predicted from the preceding several sample values, and the difference between the predicted and actual sample values is taken. The difference is normalized by a scale factor, then quantized, the scale factor being adjusted to prevent overflow or underflow during quantization. Appropriate control of the scale factor according to the size of the prediction difference enables quantization error to be reduced, yielding improved quality when the signal is decoded and reproduced.

A known method of controlling the scale factor calculates the logarithm of the scale factor of the next sample as a weighted combination of the logarithm of the current scale factor and the current quantized difference value. The method can be described by the following equations, in which u(n) is the scale factor of the n-th sample, y(n) is the logarithm of u(n), D(n) is the prediction difference of the n-th sample, I(n) is the quantized value of D(n), W is a weighting function, and d is a constant between zero and one (0<δ<1).

$$y(n+1)=(1-\delta)\cdot y(n)+\delta\cdot W[I(n)]$$

$$u(n+1)=exp[y(n+1)]$$

The weighting function W can be derived from theory or experiment, and is given by a mathematical formula or look-up table. The encoder and decoder both use the same function W.

The first equation above is equivalent to applying the function W to the current encoded value I(n), and passing the result through a first-order recursive low-pass filter. This filtering causes the effect of past values of the scale factor to decay at a fixed rate determined by (1−δ). If a transmission error occurs, the internal states of the encoder and decoder will temporarily become inconsistent, but they will converge at this rate until they match again.

The method described above accordingly provides a degree of robustness in the presence of transmission errors. If a μ-law PCM voice signal having a rate of 64 kbits/s is transmitted at 32 kbits/s in this way, for example, a subjective MOS evaluation of about 3.5 can be maintained up to a bit error rate of about 0.01%.

If this method is employed under high-error-rate conditions, however, which are not uncommon in mobile communication systems, spike noise tends to appear in the reproduced signal, causing serious degradation of voice quality, as noted earlier. The present invention addresses this problem by allowing the value of the parameter δ to vary according to the current size of the scale factor, so that when the scale factor is small it is allowed to change rapidly, and when the scale factor is large it is forced to change more slowly.

When the power of the audio input signal is comparatively high, the prediction difference signal tends to be large, so the scale factor has large values. If the decoder were allowed to respond quickly to short-term changes, a few closely-spaced transmission errors could cause it to drastically alter the scale factor, creating a spike in the reproduced waveform. By responding more slowly, the invented decoder invented decoder avoids such spike noise.

When the power of the input audio signal is comparatively low, the prediction difference tends to be small, and the scale factor is also small. If the scale factor were forced to respond slowly under these conditions, noticeable quantization error (overload noise) would occur. By allowing the scale factor to change more rapidly, this type of noise is avoided, and since the scale factor is not large, transmission errors cannot cause significant spikes. In fact, when the scale factor is small, noise due to transmission errors causes almost no perceptible degradation of voice quality.

The invented encoder and decoder thus avoid both spike noise at high signal power levels, and overload noise at low signal levels.

Referring now to FIG. 8, the audio encoders 111 and 211 each comprise a subtractor 402, an adaptive quantizer 403, an adaptive dequantizer 405, an adder 406, an adaptive predictor 407, and a quantizing scale adapter 408. The quantizing scale adapter 408 comprises a weighting converter 411, a logarithmic scale factor calculator 412, and a novel δ-adapter 413.

Next the encoding operation will be described.

The encoder receives, from an input terminal 401, an audio signal which has been sampled at a frequency of 8 kHz and digitized at a uniform rate of sixteen bits per sample. The sample values S are supplied to the subtractor 402, which calculates the difference between each sample and its predicted value Se. The resulting prediction difference value D is supplied to the adaptive quantizer 403.

The adaptive quantizer 403 normalizes the prediction difference signal D by dividing it by a scale factor u, which is obtained from a logarithmic scale factor y output by the quantizing scale adapter 408. Specifically, $u=2^Y$. The normalized prediction difference signal D is quantized according to a quantization table with fifteen levels, and converted to a four-bit ADPCM value I.

The ADPCM-encoded value I is output from an output terminal 404 to the channel encoder 112 or 212 shown in FIG. 1. The value of I is also supplied to the adaptive dequantizer 405 and quantizing scale adapter 408. The quantizing scale adapter 408 outputs the logarithmic scale factor y to the adaptive quantizer 403 and adaptive dequantizer 405.

The adaptive dequantizer 405 dequantizes the ADPCM-encoded value I according to a dequantization table, then multiplies the result by the scale factor u, derived as before as $u=2^y$, to produce a dequantized value Dq. The adder 406 adds Dq to the current predicted value Se, and supplies the sum Sq, which represents the reproduced signal, to the adaptive predictor 407. The adaptive predictor 407 uses Sq in predicting the value of the next sample.

The adaptive predictor 407 comprises an adaptive digital filter having coefficients that are controlled responsive to the reproduced signal Sq. Various well-known types of filters and various methods of controlling their coefficients can be employed. The present embodiment uses, for example, a transversal filter with ten adaptive zeros, four adaptive poles, and sixteen fixed poles, and controls the filter coefficients by a simple gradient rule. The adaptive poles are monitored, and modification of the coefficients is suspended if these poles move outside the stable region (the unit circle on the complex plane).

In the quantizing scale adapter 408, the weighting converter 411 applies a weighting function W to the ADPCM code value I, and supplies the resulting value W(I) to the logarithmic scale factor calculator 412. The function W is given by a look-up table. The logarithmic scale factor calculator 412 comprises a first-order recursive low-pass filter, as described above, which calculates the logarithmic scale factor y(n+1) for the next sample by the following equation.

$$y(n+1)=[1-\delta(n)]\cdot y(n)+\delta(n)\cdot W(I(n))$$

The parameter δ(n) is no longer a constant, but varies between zero and one in response to the size of y(n), under control of the novel δ-adapter 413. The δ-adapter 413 controls the parameter δ(n) so that it is a monotonic decreasing function of the logarithmic scale factor y(n). Various control rules can be employed, such as, for example, the following, in which a and b are certain positive constants, and ymin and ymax are the minimum and maximum values of the logarithmic scale factor y(n).

$$\delta(n) = 2\left[-\left(a \cdot \frac{y(n) - y\min}{y\max - y\min} + b\right)\right]$$

The present embodiment employs this rule with a=4 and b=6. As y(n) increases from its minimum value ymin to its maximum value ymax, the value of δ(n) decreases from $2^{-6}$ to $2^{-10}$, and the passband of the first-order recursive low-pass filter narrows correspondingly, forcing y(n) to change more slowly.

Next the structure of the audio decoders 117 and 216 will be described. Referring to FIG. 9, each of these comprises an adaptive dequantizer 432, an adder 433, an adaptive predictor 435, and a quantizing scale adapter 436. The quantizing scale adapter 436 has the same structure as the quantizing scale adapter 408 in FIG. 8, comprising a weighting converter 441, a logarithmic scale factor calculator 442, and the novel δ-adapter 443.

The ADPCM code I from the channel decoder 116 or 215 in FIG. 1 is input at an input terminal 431 and processed by the same procedure as in FIG. 8. The adaptive dequantizer 432 dequantizes the ADPCM code I according to a dequantizing table and multiplies it by a scale factor $u=2^y$, producing a dequantized value Dq. The adder 433 adds Dq to a predicted value Se output by the adaptive predictor 435, thus obtaining a reproduced signal Sq, which is output at an output terminal 434. The adaptive predictor 435 uses Sq in predicting the value of the next sample. The adaptive predictor 435 is similar to the adaptive predictor 407 in the encoder, comprising an adaptive digital filter with coefficients that are controlled responsive to Sq, by the same rule as in the encoder.

The quantizing scale adapter 436 is similar to the quantizing scale adapter 408 in FIG. 8. The weighting converter 441 applies the same function W to the ADPCM code value I, the logarithmic scale factor calculator 442 calculates the logarithmic scale factor y by the same first-order recursive low-pass filter equation, and the δ-adapter 443 controls the parameter δ(n) according to the size of the logarithmic scale factor y, so that it is a monotonic decreasing function of the logarithmic scale factor y, using the same rule as in the encoder.

Figure 10:
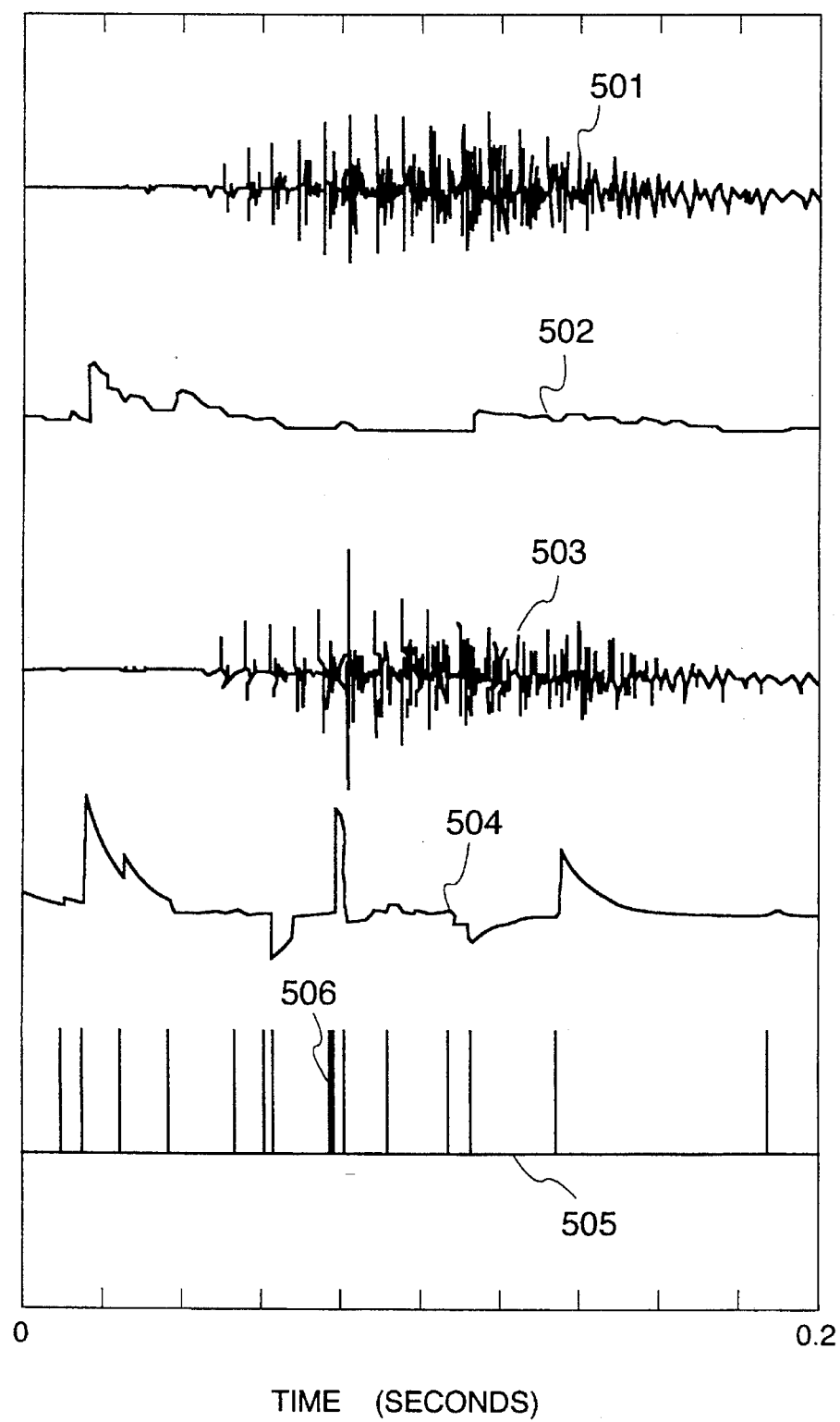
FIG. 10 is a waveform diagram showing the effect of the invented audio encoders and decoders.

FIG. 10 shows a reproduced signal waveform 501 output by the audio decoder of this embodiment, together with the difference (error) 502 in the logarithmic scale factor y between the audio encoder and decoder, the signal waveform 503 reproduced by the conventional method with a fixed value of δ, the conventional logarithmic scale factor error 504, and the location of transmission bit errors 505. The bit error rate is substantially 0.3%. In the conventional method, the value of d is fixed at $2^{-6}$, allowing comparatively rapid change in the scale factor even at high signal power levels. As a result, a pair of closely-spaced bit errors 506 cause a pronounced spike in the conventional reproduced waveform 504. In the waveform 501 reproduced by the present embodiment, this spike is suppressed. Error in the logarithmic scale factor y is also reduced.

The invented method of adjusting the value of δ in the low-pass filter in the quantizing scale adapter improves the quality of the reproduced audio signal under high transmission error rates, without impairing audio quality at low transmission error rates. The low-pass filter in the preceding description was a first-order recursive filter, but the invention can be practiced with other types of low-pass filters, such as a non-recursive filter, or a higher-order recursive filter, or a combination of both.

Second embodiment

Next, a second embodiment of this invention will be described. This second embodiment is identical to the first except for the structure of its interference canceler 104, so the description will be confined to the interference canceler 104.

The interference canceler in the first embodiment stored M copies of the received baseband signal E(t) in M shift registers, and gradually canceled interference from each shift register so as to leave only the baseband signal of the corresponding mobile station. The interference canceler of the second embodiment, in contrast, gradually builds up the baseband signals of the M mobile stations in buffers, by transferring into these buffers estimates taken from the received baseband signal E(t), at the same time canceling these estimates from the received baseband signal E(t) as interference.

Interference canceler

Figure 11:
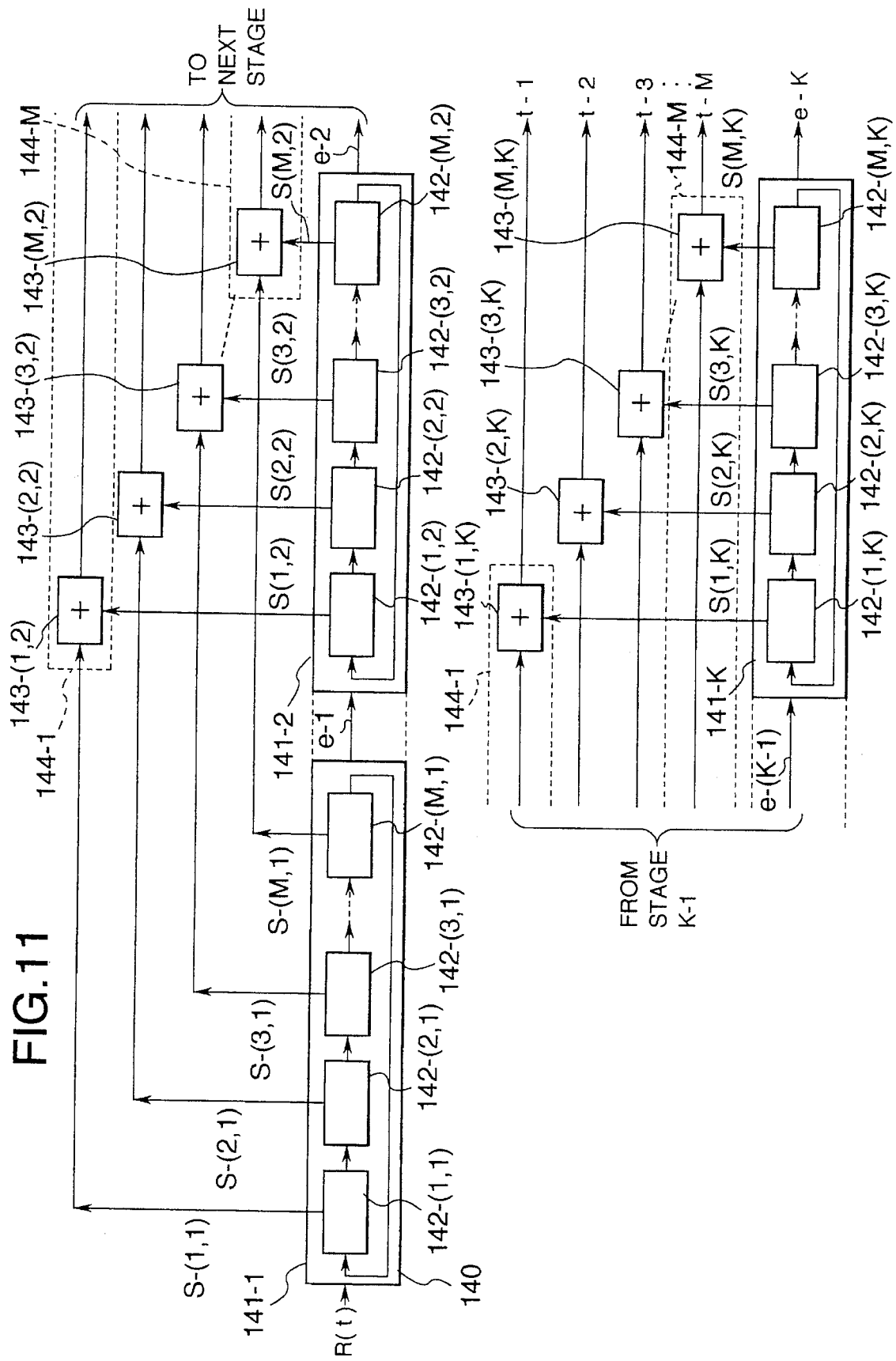
FIG. 11 is a block diagram of the interference canceler in a second embodiment of the invention.

FIG. 11 shows the conceptual structure of the interference canceler 104 in the second embodiment.

The received baseband signal E(t) in FIG. 11 is stored in and shifted through a single shift register 140 comprising K stages 141-1 to 141-K, each of which holds a one-symbol portion of the received baseband signal. The chip data held in each of these shift-register stages 141-j are processed by M interference processors 142-(1, j) to 142-(M, j), which are here shown superimposed on the j-th shift-register stage 141-j. For example, the data in the first shift-register stage 141-1 are processed by the M interference processors 142-(1, 1), 142-(2, 1), ..., 142-(M, 1), which operate in a cyclic order, as indicated by the arrows. Each interference processor 142-(i, j) outputs an estimated signal S-(i, j), which is also an estimated interference signal.

After being processed by all the interference processors 142-(i, 1), the modified baseband signal that leaves the first shift-register stage 141-1 is denoted e-1. Similarly, e-2, ..., e-K denote the baseband signal after processing in stages 141-2, ..., 142-K.

Paralleling the interference processors of the second to K-th stages are a plurality of buffer adders 143-(i, j). For each station i, the buffer adders 143-(i, 2) to 143-(i, K) are coupled in series, forming a single buffer 144-i. The drawing identifies buffer 144-1, which stores the estimated signals of the first mobile station, and buffer 144-M, which stores the estimated signals of the M-th station. The first buffer adder 143-(i, 2) in each buffer 144-i is coupled to the first-stage interference processor 142-(i, 1). Buffer adder 143-(i, j) receives and temporarily stores the output of the preceding buffer adder 143-(i, j−1), later adds to it the estimated signal S-(i, j) received from interference processor 142-(i, j), and outputs the result. The last buffer adders 143-(i, K) output final estimated signals t-i.

Although not shown in FIG. 11, the interference canceler also has a controller for detecting symbol boundaries, as in the first embodiment.

Figure 12:
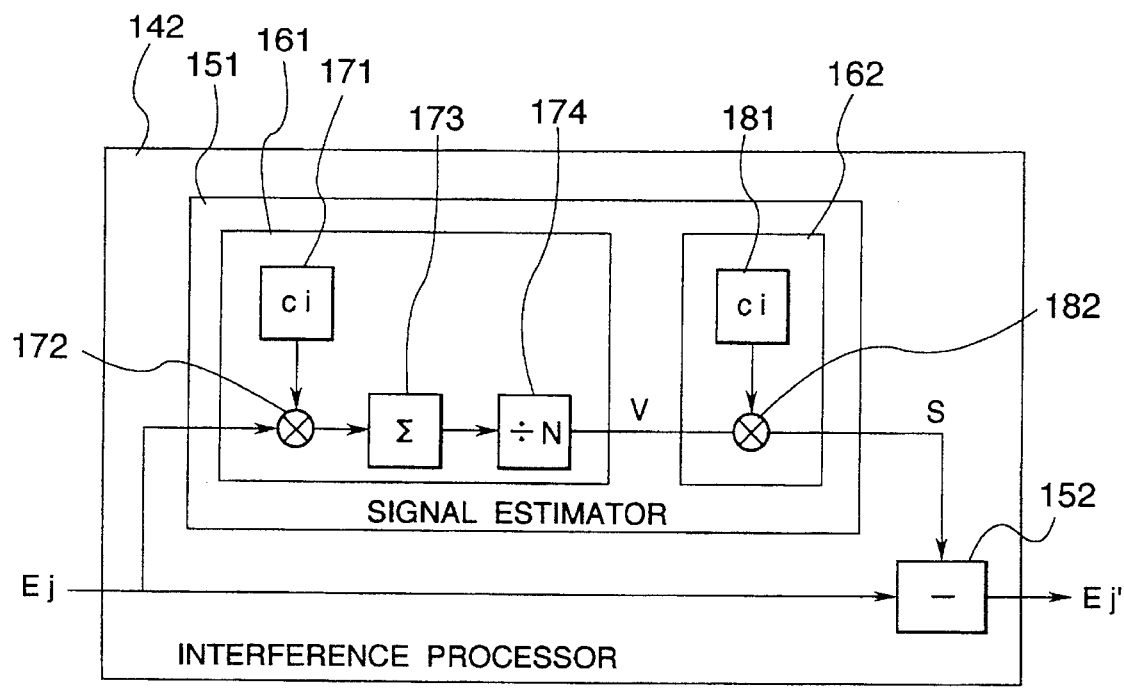
FIG. 12 is a block diagram of an interference processor in the interference canceler of the second embodiment.

FIG. 12 shows the structure of an interference processor 142-(i, j), comprising a signal estimator 151 and subtractor 152. The signal estimator 151 comprises a symbol estimator 161 and an interference estimator 162. The symbol estimator 161 comprises an upstream spreading-code generator 171, a multiplier 172, an accumulator 173, and a normalizer 174. The interference estimator 162 comprises an upstream spreading-code generator 181 and a multiplier 182.

The symbol estimator 161 receives the contents Ej of shift-register stage 141-j, and generates an estimated symbol value V(i, j), indicated in FIG. 12 by the letter V. The interference estimator 162 receives V and generates the estimated signal S-(i, j), indicated in FIG. 12 by the letter S. The subtractor 152 subtracts S from Ej, and writes the resulting chip data Ej' back to the same shift-register stage 142-j.

All of the interference processors 142-(i, j) have the structure shown in FIG. 12.

Next the operation of this interference canceler will be described. The mobile stations will be assumed to be numbered from one to M in the order in which their symbol boundaries appear in the received baseband signal E(t).

When a symbol boundary of the first mobile station appears in the received signal E(t), all K of the interference processors 142-(1, 1), . . . , 142-(1, K) are activated and their accumulators 173 are cleared. In each interference processor 142-(1, j), the symbol estimator 161 reads the contents Ej of shift-register stage 141-j, comprising N chip values, and despreads them as follows. The upstream spreading-code generator 171 generates the corresponding chips c1(t) of the first station's upstream spreading code, and the multiplier 172 multiplies them by the shift-register contents Ej. The accumulator 173 accumulates the resulting products, and the normalizer 174 normalizes the resulting sum by dividing by N, obtaining the estimated symbol value V-(1, j).

The interference estimator 162 now respreads the estimated symbol value V-(1, j): the upstream spreading-code generator 181 generates the same spreading code c1(t) again, and the multiplier 182 multiplies V-(1, j) by this spreading code. The resulting estimated signal S-(1, j) is furnished to buffer adder 143-(1, j) and to subtractor 152. Subtractor 152 subtracts S-(1, j) from the shift-register contents Ej, thereby canceling what, with respect to the second through M-th mobile stations, is an estimated interference signal.

Each buffer adder 143-(1, j) adds the estimated signal S-(1, j) to the previous output of the preceding buffer adder 143-(1, j−1), which it holds temporarily stored. Both S-(1, j) and this temporarily-stored previous output pertain to the same symbol. Their sum is output to the next buffer adder S-(i, j+1). The first buffer adder 143(1, 2) holds the previous output S-(1, 1) of interference processor 142-(1, 1) instead of the output of a preceding buffer adder. The last buffer adder 143-(1, K) outputs a final estimated signal t-1.

When a symbol boundary of the second mobile station appears in the received signal E(t), interference processors 142-(2, 1) to 142-(2, K) are activated and operate in a like manner, resulting in output of a final estimated signal t-2 for the second mobile station from buffer adder 143-(2, K).

Similar operations are performed when symbol boundaries of the other mobile stations are recognized. As a chip of the received baseband signal E(t) moves through the shift register, it is modified K·M times, M times in each stage. If K is sufficiently large, the final chip values e-K output from the last shift-register stage 141-K will be very close to zero. Nearly all of the baseband signal E(t) input to the shift register will have been canceled from the shift register 140 as interference, distributed to the buffer adders 143-(i, j), and output in the form of the estimated signals t-i of individual mobile stations.

The estimated symbol value V-(i, k) and estimated signal S-(i, k) produced for the i-th station in interference processor 142-(i, k), and the remaining baseband signal e-k output from the k-th shift-register stage 141-k can be expressed by the following equations, in which Ek(t) represents the chip data present in the k-th shift-register stage 141-k, and ei(t) represents the upstream spreading code of the i-th mobile station. Although not explicitly indicated, S(i, k) is also a function of t.

$$V(i, k) = (1/N) \cdot \sum_{t=1}^{N} E_k(t) \cdot ci(t)$$

$$S(i, k) = V(i, k) \cdot ci(t)$$

$$e-k = e-(k-1) - \sum_{j=1}^{M} S(j, k)$$

The final estimated signal t-i of the i-th mobile station, which is output from buffer adder 143-(i, K), can be expressed by the following equation.

$$t-i = \sum_{k=1}^{K} S(i, k)$$

The final estimated signals t-i can be supplied to correlators in the spreading demodulators 114, analogous to the correlators 225-I and 225-Q in FIG. 3. Alternatively, further processing can be carried out, as described below.

The final estimated signals t-i have extracted nearly all the information from the received baseband signal E(t), but for the small part still remaining in e-K. If e-K were to be added to each of the estimated signals t-i, the result would be the following signal ui.

$$\begin{aligned} ui &= e - K + \sum_{k=1}^{K} S(i, k) \\ &= \left[ E(t) - \sum_{k=1}^{K} \sum_{j=1}^{M} S(j, k) \right] + \sum_{k=1}^{K} S(i, k) \\ &= E(t) - \sum_{k=1}^{K} \left\{ \left[ \sum_{j=1}^{M} S(j, k) \right] - S(i, k) \right\} \\ &= E(t) - \sum_{k=1}^{K} \sum_{j=1}^{M} S(j, k) \ (j \neq i) \\ &= E(t) - \sum_{\substack{j=1 \\ j \neq i}}^{M} t-j \end{aligned}$$

That is, ui is what is left when the final estimated signals of all other mobile stations have been canceled from the received baseband signal E(t). In other words, ui represents the baseband signal transmitted by the i-th mobile station, after all estimated interference from other stations has been canceled away. In general, ui will be even closer than t-i to the true baseband signal transmitted by the i-th mobile station. The ui values can thus be output to the spreading demodulators 114 instead of t-i.

If the above ui is correlated with the i-th station's spreading code ci(t), the result is the following estimated symbol value t'-i.

$$\begin{aligned} t'-i &= (1/N) \cdot \sum_{t=1}^{N} \left\{ \left[ e-K+\sum_{k=1}^{K} S(j, k) \right] \cdot ci(t) \right\} \\ &= \left[ (1/N) \cdot \sum_{t=1}^{N} e-K \cdot ci(t) \right] + \sum_{k=1}^{K} V(i, k) \end{aligned}$$

The second term on the right is the same as the correlation of t-i with the spreading code ci; the first term on the right represents a small correction to this correlation. These improved correlations t'-i may be output directly to the channel decoders 116, instead of outputting t-i or ui to the spreading demodulators 114.

Although the interference canceler in FIG. 11 is structured differently from the interference canceler in FIG. 4, it is similar in its effect, supplying estimated baseband signals or symbol values from which interference has been canceled M·K times. As in the first embodiment, this extensive and thorough interference cancellation results in a lowered error rate.

Convergence in the second embodiment can be improved and the error rate lowered still further by performing a correction calculation as in the first embodiment. Before being respread in the interference estimator 162, the estimated symbol value V can be modified by, for example, limiting it to a maximum absolute value n, taking the square root of the absolute value, or multiplying by a constant $\alpha$, then limiting the absolute value to n, as described by any of the following mathematical operations.

$$V \leftarrow \begin{cases} n \cdot \text{sign}(V) & (|V| \geq n) \\ V & (|V| < n) \end{cases}$$

$$V \leftarrow \text{sign}(V) \cdot \text{sqrt}(|V|)$$

$$V \leftarrow \begin{cases} n \cdot \text{sign}(V) & (|\alpha \cdot V| \geq n) \\ \alpha \cdot V & (|\alpha \cdot V| < n) \end{cases}$$

Since the M interference processors 142-(i, j) (i=1, ..., M) that process the j-th shift-register stage 141-j are structurally identical and operate in a cyclic sequence, it is possible to replace them with a single interference processor capable of generating the upstream spreading codes $c_i(t)$ of all mobile stations, so that only K interference processors are required in all. If sufficient processing speed is available, these K interference processors can be further reduced to a single interference processor, having the structure shown in FIG. 12, which processes the K shift-register stages 141-1 to 141-K in turn each time a symbol boundary is recognized.

Third embodiment

The preceding embodiments have employed synchronous detection on the downstream channel, the downstream carrier generator 221 of the mobile-station spreading demodulator 214 in FIG. 3 being synchronized in phase to the downstream carrier generator 123 of the base-station spreading modulator 113 in FIG. 2. It would be preferable, however, to employ asynchronous detection, thus avoiding the need to equip the mobile-station apparatus with extra circuitry for acquiring and maintaining carrier phase synchronization.

To implement asynchronous detection on the downstream channel, the third embodiment adapts the base-station spreading modulator 113 to add a control signal to the downstream signal, and adapts the mobile-station spreading demodulators 214 to estimate the carrier phase from this control signal and perform an appropriate phase rotation when despreading the received signal.

The structure and operation of the adapted spreading modulator 113 and demodulator 214 will be described below. In other respects, the third embodiment is identical to the first or second embodiment.

Spreading modulator

Figure 13:
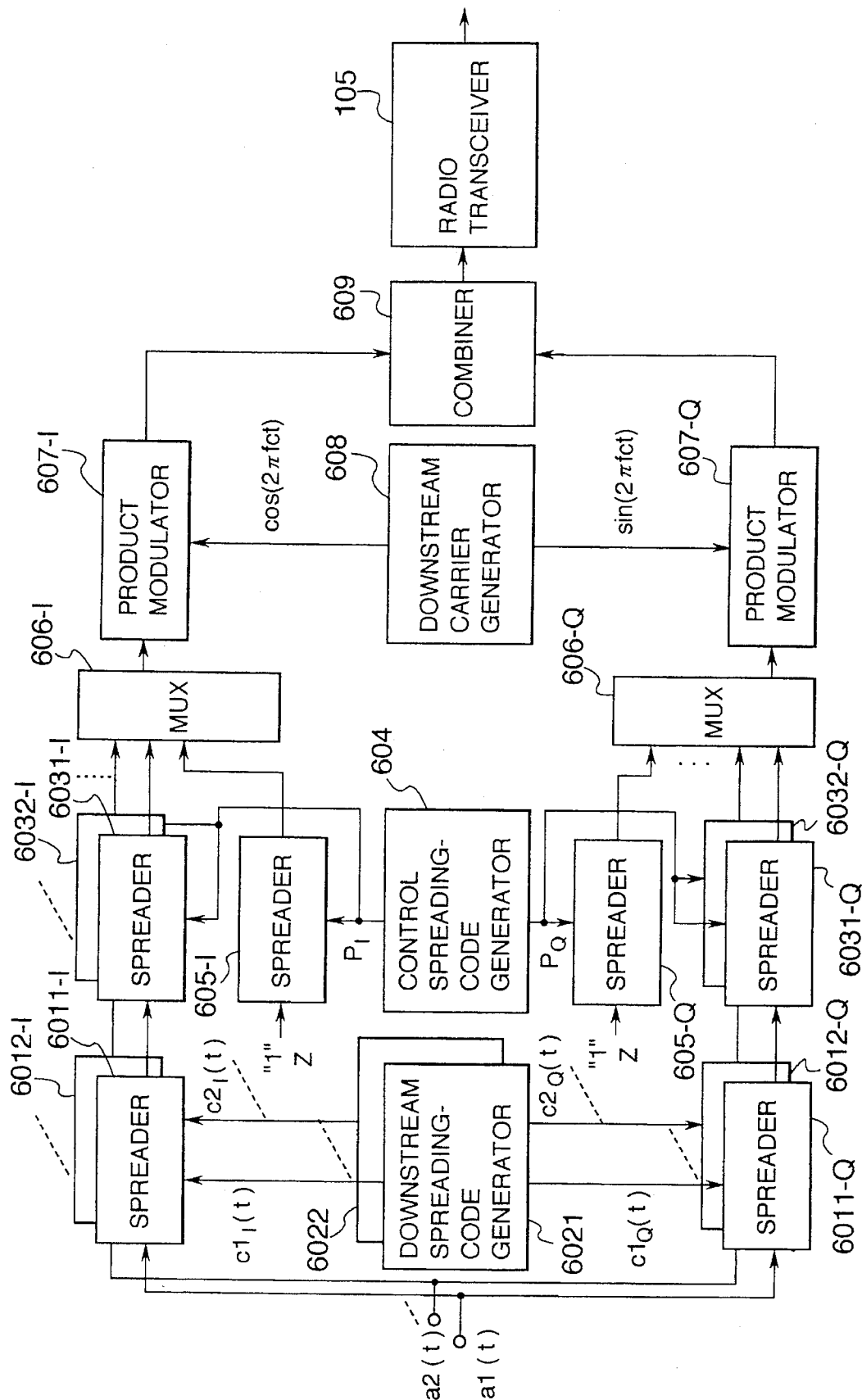
FIG. 13 is a block diagram of the base-station spreading modulator in a third embodiment of the invention.

FIG. 13 is a block diagram showing the structure of the spreading modulator 113 of the third embodiment. The spreading modulator 113 shown in FIG. 13 differs from the the spreading modulator 113 in FIG. 2 in that it multiplexes the baseband signals for all mobile stations before, instead of after, carrier modulation. Moreover, in addition to these baseband signals, it generates and spreads a control signal, and multiplexes this control signal together with the baseband signals. Furthermore, instead of having a separate spreading modulator 113 for each transmit processor 101, the third embodiment has a single spreading modulator 113 that is shared by all the transmit processors 101.

The spreading modulator 113 in FIG. 13 resembles the one in FIG. 2 in dividing the downstream spreading codes into two parts and transmitting the baseband signals on both in-phase (I) and quadrature (Q) carrier signals $\cos 2\pi fct$ and $\sin 2\pi fct$. As in FIG. 2, the suffix I will be attached to elements related to the in-phase component, and the suffix Q to elements related to the quadrature component.

The spreading modulator 113 in FIG. 13 comprises a plurality of spreaders 6011-I, 6012-I, ..., 6011-Q, 6012-Q, ..., 6031-I, 6032-I, ..., 6031-Q, 6032-Q, ..., 605-I, and 605-Q, a plurality of downstream spreading-code generators 6021, 6022, ..., a control spreading-code generator 604, multiplexers 606-I and 606-Q, product modulators 607-I and 607-Q, a carrier generator 608, and a combiner 609.

The spreaders and spreading-code generators are here numbered according to the mobile stations. The spreaders 601k-I and 601k-Q spread signals intended for the k-th mobile station, and are equivalent to the spreaders 122-I and 122-Q in FIG. 2. The downstream spreading-code generator 602k generates the downstream spreading code of the k-th station, and is equivalent to the downstream spreading-code generator 121 in FIG. 2. Multiplexers 606-I and 606-Q replace the multiplexer 103 in FIG. 2. Product modulators 607-1 and 607-Q are equivalent to the product modulators 124-I and 124-Q in FIG. 2. The downstream carrier generator 608 is equivalent to the downstream carrier generator 123 in FIG. 2, and the combiner 609 is equivalent to the combiner 125 in FIG. 2.

Spreaders 603k-I, 603k-Q, 605-I, and 605-Q and the control spreading-code generator 604 are new elements that have been inserted in order to add a control signal to the transmitted signal. The control signal can have any known value. The control signal in this embodiment, indicated by the letter Z in FIG. 13, is a constant signal with the value of plus one.

Besides being mutually orthogonal, the downstream spreading codes $ck(t)$ in this third embodiment are selected so that each of the partial spreading codes $ck_I(t)$ and $ck_Q(t)$ satisfies a zero-sum condition:

$$\sum_{t=1}^{N/2} ck_I(t) = \sum_{t=2}^{N/2} ck_Q(t) = 0$$

If $ck_I(t)$ and $ck_Q(t)$ consist of the even and odd chips, respectively, of $ck(t)$, this condition amounts to requiring orthogonality to spreading codes $(1, 1, 1, 1, 1, 1, \ldots)$ and $(1, -1, 1, -1, 1, -1, \ldots)$, and reduces the available number of spreading codes only slightly, e.g. from N to N−2.

The control spreading-code generator 604 generates a control spreading code $p(t)$ that has the same chip rate as the downstream spreading codes $ck(t)$, and is similarly divided into two parts $p_I(t)$ and $p_Q(t)$. The only condition that this control spreading code $p(t)$ need satisfy is that the two parts $p_I(t)$ and $p_Q(t)$ be identical, so that for all t, the following equalities hold:

$$p_I(t)^2 = p_Q(t)^2 = p_I(t) \cdot p_Q(t) = 1$$

Next the operation of this spreading modulator will be described.

Symbol data ak(t) to be transmitted to the k-th mobile station are supplied to spreaders 601k-I and 601k-Q and spread by partial spreading codes $ck_I(t)$ and $ck_Q(t)$, which are supplied from spreading-code generator 602k.

The signals output by spreaders 601k-I and 601k-Q are supplied to further spreaders 603k-I and 603k-Q, where they are spread by the partial spreading codes $p_I$ and $p_Q$ supplied from the control spreading-code generator 604. The resulting baseband signals have the form $ak(t) \cdot ck_I(t) \cdot p_I(t)$ and $ak(t) \cdot ck_Q(t) \cdot p_Q(t)$. The partial spreading codes $p_I(t)$, $p_Q(t)$, $ck_I(t)$, and $ck_Q(t)$ all have the same chip rate of N/2 chips per symbol, so the further spreading by $p_I(t)$ and $p_Q(t)$ does not raise the chip rate or increase the bandwidth of the downstream channel.

The control signal Z is also spread in spreaders 605-I and 605-Q by the partial spreading codes $p_I(t)$ and $p_Q(t)$ supplied from the control spreading-code generator 604. Since the control signal Z has a constant value of plus one, the spread signals output by spreaders 605-I and 605-Q are equal to $p_I(t)$ and $p_Q(t)$, respectively.

The signals output by spreaders 6031-I, 6032-I, . . . and 605-I are multiplexed by multiplexer 606-I. Similarly, the signals output by spreaders 6031-Q, 6032-Q, . . . and 605-Q are multiplexed by multiplexer 606-Q. The multiplexed signals output by the multiplexers 606-I and 606-Q contain spread versions of the transmit data a1(t), a2(t), . . . for all mobile stations, and of the control signal Z.

These multiplexed outputs are furnished to respective product modulators 607-I and 607-Q, and multiplied by the downstream carrier signals $\cos(2\pi fct)$ and $\sin(2\pi fct)$ supplied from the carrier generator 608. The resulting modulated signals are combined by the combiner 609, supplied to the radio transceiver 105, and transmitted to all mobile stations.

If the I and Q components are treated as the real and imaginary parts of a complex number, the transmitted signal S can be represented as the sum of a real part $S_I$ and a complex part $jS_Q$ (j representing the square root of minus one). At the baseband, omitting the time parameter t for notational convenience, the transmitted signal can be described by the following equation.

$$S = S_I + jS_Q = p_I \cdot \left(1 + \sum_{i=1}^{M} ai \cdot ci_I\right) + jp_Q \cdot \left(1 + \sum_{i=1}^{M} ai \cdot ci_Q\right)$$

Spreading demodulator

Figure 14:
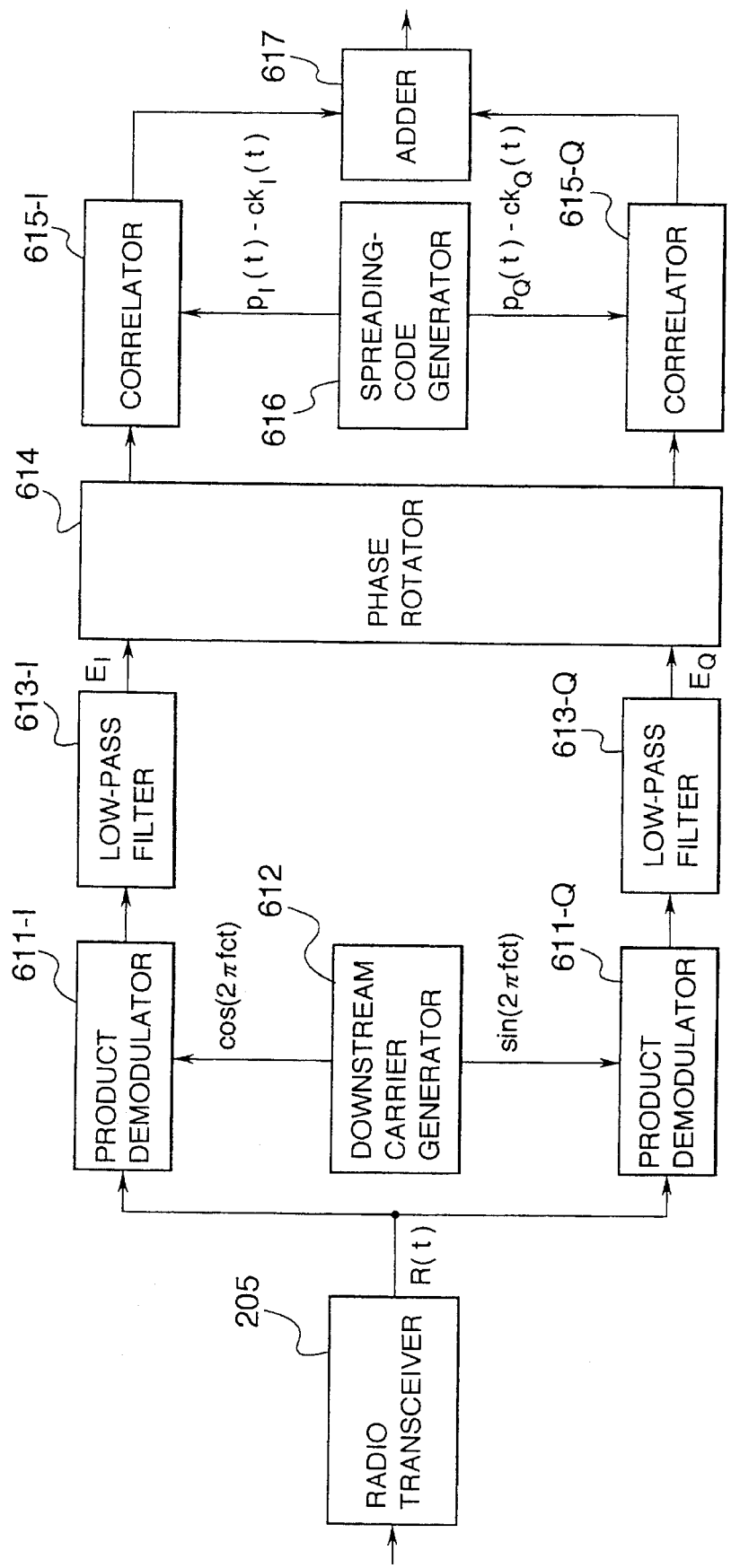
FIG. 14 is a block diagram of the mobile-station spreading demodulator in the third embodiment.

FIG. 14 shows the structure of the spreading demodulator 214 of the k-th mobile station in the third embodiment, comprising product demodulators 611-I and 611-Q, a carrier generator 612, low-pass filters 618-I and 613-Q, a phase rotator 614, correlators 615-I and 615-Q, a spreading-code generator 616, and an adder 617.

Product demodulators 611-1 and 611-Q are equivalent to product demodulators 222-1 and 222-Q in FIG. 3, low-pass filters 613-1 and 613-Q to low-pass filters 223-1 and 223-Q in FIG. 3, correlators 615-1 and 615-Q to correlators 225-1 and 225-Q in FIG. 3, and adder 617 to the adder 226 in FIG. 3.

The carrier generator 612, differing from the carrier generator 221 in FIG. 3, need not be synchronized to the base-station downstream carrier generator 608.

The phase rotator 614 is a new element that has been added to permit asynchronous detection. Using the control signal Z included in the received signal, it estimates the carrier phase difference between the carrier generators at the base station and mobile station, and rotates the received baseband signal in the complex plane so as to cancel this difference. The detailed structure of the phase rotator 614 will be shown later.

The spreading-code generator 616 supplies correlator 615-1 with the product spreading code $p_I(t) \cdot ck_I(t)$, and supplies correlator 615-Q with a similar product spreading code $p_Q(t) \cdot ck_Q(t)$.

Next the overall operation of this spreading demodulator will be described.

The received downstream signal R(t) output from the radio transceiver 205 is supplied to product demodulators 611-I and 611-Q, multiplied by carrier signals $\cos(2\pi fct)$ and $\sin(2\pi fct)$ supplied from the carrier generator 612, then filtered by low-pass filters 613-I and 613-Q to obtain in-phase and quadrature received baseband signals $E_I(t)$ and $E_Q(t)$. Using complex-number notation and again omitting the time parameter t, the received baseband signal E is denotable as $E_I + jE_Q$.

If the phase difference between the transmitting and receiving carrier generators is $\phi$ radians, and the channel gain between the spreading modulator 113 and demodulator 214 is $\beta$, then the received baseband signal E is related to the transmitted baseband signal S as follows:

$$E = \beta e^{j\phi} \cdot S$$

Figure 15:
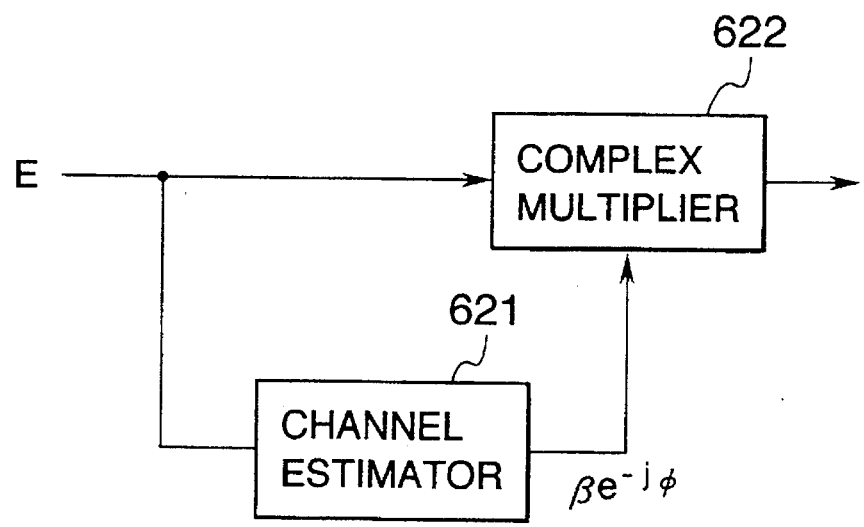
FIG. 15 is a general block diagram of the phase rotator in the third embodiment.

Referring to FIG. 15, the phase rotator 614 comprises a channel estimator 621 arid complex multiplier 622. The channel estimator 621 estimates the above parameters $\beta$ and $\phi$, and provides the complex multiplier 622 with the complex conjugate quantity $\beta e^{-j\phi}$. The complex multiplier multiplies the received baseband signal E by this quantity, thereby obtaining the transmitted signal S. More precisely, the signal obtained is $\beta^2 S$:

$$\beta e^{-j\phi} \cdot E = \beta e^{-j\phi} \cdot \beta e^{j\phi} \cdot S = \beta^2 S$$

Although the weighting of S by multiplication by the square of the channel gain $\beta$ serves no particular purpose in the present embodiment, it is useful in systems configured to deal with multipath fading by taking a weighted combination of signals received on different paths.

The complex multiplier 622 provides $\beta^2 S$ to the correlators 615-I and 615-Q. Referring again to FIG. 14, these correlators correlate $\beta^2 S$ with the product spreading codes $p_I(t) \cdot ck_I(t)$ and $p_Q(t) \cdot ck_Q(t)$ to obtain despread signals, which are added in the adder 617 to recover the transmit data ak(t) of the k-th mobile station.

Next, the structure and operation of the phase rotator 614 will be described in more detail, referring to FIGS. 16 to and 17.

Figure 16:
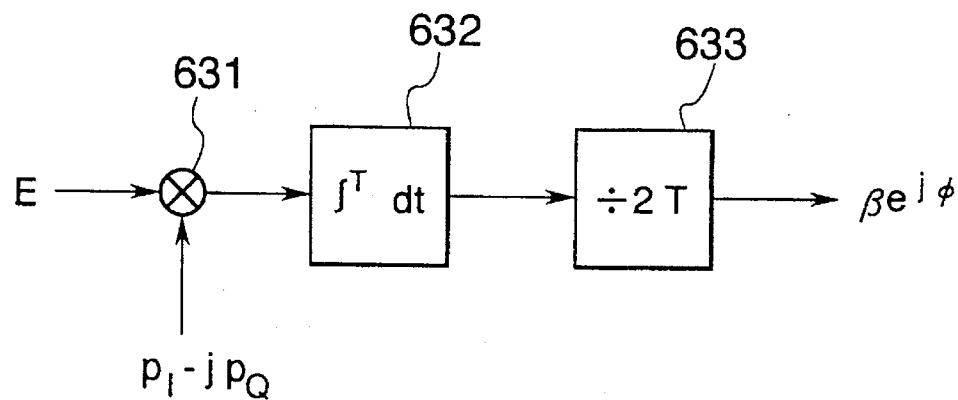
FIG. 16 illustrates the operation of the channel estimator in FIG. 15.

FIG. 16 shows how the path estimator 621 estimates the phase difference $\phi$ and gain $\beta$. The first step, performed by a complex multiplier 631, is to multiply the received baseband signal E by the complex conjugate $P_{I-jpQ}$ of the control spreading code p. The received baseband signal E can be expanded as follows:

$$E = \beta e^{j\phi} S = \beta e^{j\phi} [S_I + jS_Q]$$

The complex product of E and $P_I - jp_Q$ is:

$$E \cdot (p_I - jp_Q) = \beta e^{j\phi}(S_I + jS_Q) \cdot (p_I - jp_Q)$$
$$= \beta e^{j\phi}[(p_I S_I + p_Q S_Q) + j(p_I S_Q - p_Q S_I)]$$

In this equation, $$p_I S_I + p_Q S_Q = \left(1 + \sum_{i=1}^{M} a_i \cdot ci_I\right) + \left(1 + \sum_{i=1}^{M} a_i \cdot ci_Q\right)]$$

and $$p_I S_Q - p_Q S_I = p_I p_Q \left[\left(1 + \sum_{i=1}^{M} a_i \cdot ci_Q\right) - \left(1 + \sum_{i=1}^{M} a_i \cdot ci_I\right)\right]$$

Next, an integrator 632 integrates the result over an interval T consisting of a certain number of symbol periods. Due to the zero-sum condition on the downstream spreading codes and the condition that $p_I p_Q = 1$, the spread signals $a_i \cdot c_{iI}$ and $a_i \cdot c_{iQ}$ integrate to zero over each symbol interval, leaving:

$$\int_0^T E \cdot (p_I - jp_Q) = \int_0^T \beta e^{j\phi}[(1+1) + j(1-1)]$$
$$= 2T\beta e^{j\phi}$$

A normalizer normalizes this result by dividing by 2T to obtain $\beta e^{j\phi}$, and provides the complex conjugate $\beta e^{-j\phi}$ to the complex multiplier in FIG. 15. The integration interval T is preferably as long as possible, subject to the condition that the phase difference $\phi$ remains substantially constant on time scales of the order of T, so that $\phi$ can be estimated accurately.

Figure 17:
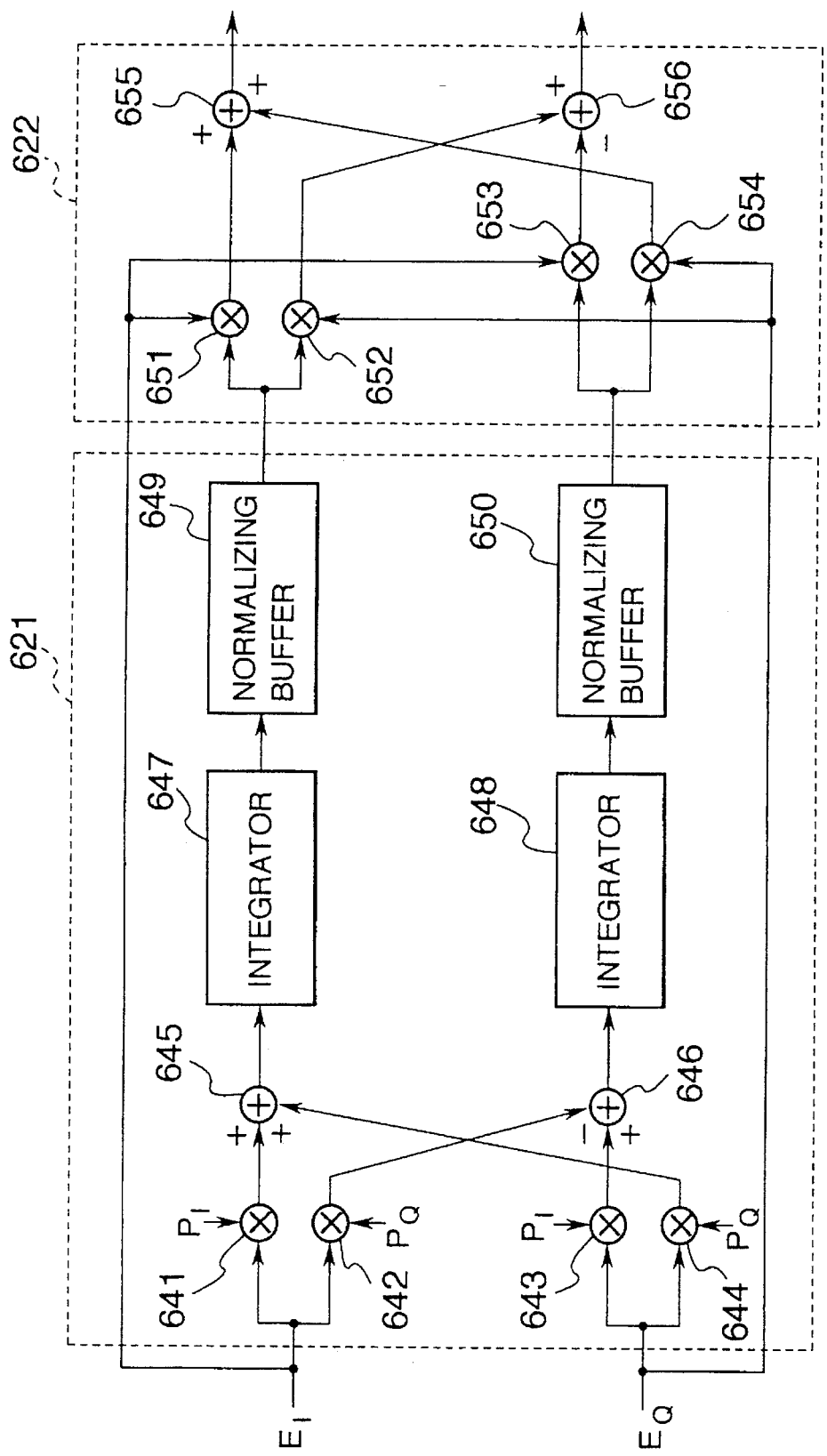
FIG. 17 is a more detailed block diagram of the phase rotator in the third embodiment.

FIG. 17 shows an example of the structure of the phase rotator 614. The channel estimator 621 comprises multipliers 641, 642, 643, and 644, adders 645 and 646, integrators 647 and 648, and normalizing buffers 649 and 650, interconnected as shown. The integrators 647 and 648 integrate their inputs over the interval T described above. At the end of an interval T, the normalizing buffers 649 and 650 divide the integrated results by 2T and hold the normalized results for the next interval of T, while the integrators are performing another integration.

The channel estimator 621 thus provides the complex multiplier 622 with an estimate of $\beta e^{j\phi}$ that is updated at intervals of T. It is also possible to have the estimate updated at every symbol period Ta: the integrators 647 and 648 can integrate over intervals of Ta instead of T; and the normalizing buffers 649 and 650 can store the most recent T/Ta integrated results and normalize their sum.

The complex multiplier 622 comprises multipliers 651, 652, 653, and 654 and adders 655 and 656, interconnected so that the received baseband signal $E = E_I + jE_Q$ is multiplied by the complex conjugate of the output of the channel estimator 621. Multiplier 655 supplies the real part of the result, equal to $\beta^2 S_I$, to correlator 615-I in FIG. 14; multiplier 656 supplies the complex part, equal to $\beta^2 S_Q$, to correlator 615-Q.

The operation performed by the complex multiplier 622 is an affine transformation on the two received baseband signals $E_I$ and $E_Q$. In geometric terms, it can be described as a spiral similarity.

Next, the operation of the correlators 615-I and 615-Q will be described. Correlator 615-I multiplies $\beta^2 S_I$ by $p_I ck_I$, integrates over the symbol period Ta, and normalizes the result, obtaining:

$$[1/(2\beta^2 Ta)] \int_0^{Ta} \beta^2 S_I \cdot p_I ck_I = [1/(2\beta^2 Ta)] \int_0^{Ta} \beta^2 p_I \cdot \left(1 + \sum_{i=1}^{M} a_i \cdot ci_I\right) \cdot p_I ck_I$$
$$= [1/(2Ta)] \int_0^{Ta} \sum_{i=1}^{M} a_i \cdot ci_I \cdot ck_I$$

Similarly, correlator 615-Q multiplies $\beta^2 S_Q$ by $p_Q ck_Q$, integrates, and normalizes to obtain:

$$[1/(2\beta^2 Ta)] \int_0^{Ta} \beta^2 S_Q \cdot p_Q ck_Q = [1/(2\beta^2 Ta)] \int_0^{Ta} \beta^2 p_Q \cdot \left(1 + \sum_{i=1}^{M} a_i \cdot ci_Q\right) \cdot p_Q ck_Q$$
$$= [1/(2Ta)] \int_0^{Ta} \sum_{i=1}^{M} a_i \cdot ci_Q \cdot ck_Q$$

When added by the adder 617, the terms in which $i \neq k$ cancel out to zero, due to the orthogonality of the downstream spreading codes, leaving the symbol $a_k$ transmitted to the k-th mobile station:

$$[1/(2Ta)] \int_0^{Ta} a_k + [1/(2Ta)] \int_0^{Ta} a_k = a_k$$

Figure 18:
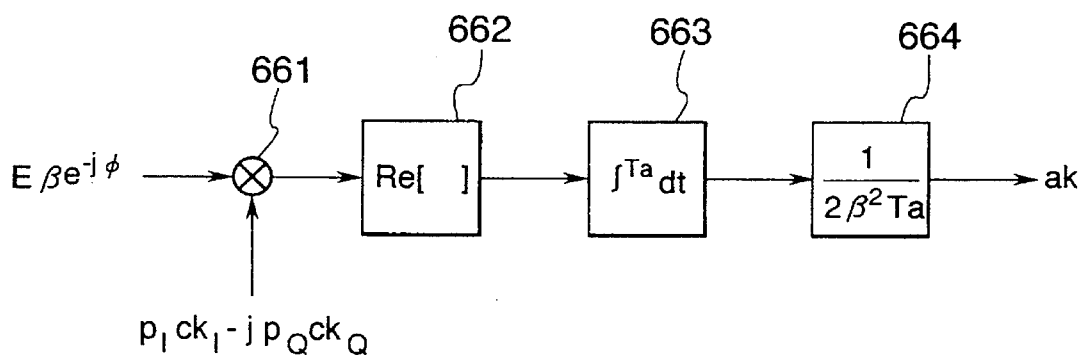
FIG. 18 illustrates the operation of the correlators and adder in FIG. 14.

FIG. 18 is a more compact mathematical depiction of these correlation and addition processes. After phase rotation, the received baseband signal $E\beta e^{-j\phi}$, which equals $\beta^2 S$ or $\beta^2(S_I + jS_Q)$, is input to a complex multiplier 661 and multiplied by $p_I ck_I - jp_Q ck_Q$. A real part extractor 662 extracts the real part of the resulting product. This real part is expressed by the following equation.

$$Re[\beta^2(S_I + jS_Q) \cdot (p_I ck_I - jp_Q ck_Q)] = \beta^2(S_I p_I ck_I + S_Q p_Q ck_Q)$$

An integrator 663 integrates over the symbol period Ta, and a normalizer 664 normalizes by dividing by $2\beta^2 Ta$, obtaining the symbol value $a_k$.

By permitting asynchronous detection on the downstream channel, the third embodiment relieves the mobile stations of carrier synchronization duties on this channel. The mobile-station apparatus 200 can accordingly be simplified and reduced in size.

The foregoing description has assumed orthogonal spreading codes on the downstream channel, but this is not a restriction. Even if the downstream spreading codes are not perfectly orthogonal, it remains advantageous to divide them into partial spreading codes for transmission on two orthogonal carrier signals, to add a control signal, and to perform asynchronous detection followed by phase rotation, as described in the first and third embodiments above.

It is not necessary to provide separately all of the elements that are shown separately in the drawings. For example, the numerous multipliers shown in FIG. 17 can be replaced by a single multiplier, which operates on data stored in different locations in a memory device. Other elements that perform similar arithmetic operations can be likewise combined, or the operations can be performed by a suitably-programmed general-purpose processor.

The shift registers in the interference cancelers described in the first and second embodiments can be conventional shift registers comprising series-coupled flip-flops, or they can be memory areas that function as shift registers through well-known pointer manipulations.

The invention is not restricted to ADPCM encoding of the audio signal. The same spreading modulators, spreading demodulators, and interference cancelers can be effectively employed with any type of digitally encoded signal.

Those skilled in the art will recognize that further modifications are possible without departing from the scope claimed below.

What is claimed is:

1. A code-division multiple-access communication system for communication between a base station and a plurality of mobile stations, comprising:

a base-station apparatus for transmitting to said plurality of mobile stations a downstream signal in which symbols to be transmitted to different mobile stations are spread by different downstream spreading codes, receiving from said plurality of mobile stations an upstream signal in which symbols from different mobile stations are spread by different upstream spreading codes, and despreading said upstream signal by correlation with respective upstream spreading codes to obtain symbols transmitted by respective mobile stations; and a mobile-station apparatus at each of said mobile stations, for receiving said downstream signal and despreading said downstream signal with one of said downstream spreading codes, spreading symbols to be transmitted to said base station by one of said upstream spreading codes to create a transmit signal, and transmitting said transmit signal as part of said upstream signal; wherein said base-station apparatus transmits said downstream signal on two mutually orthogonal carrier signals, and divides each of said downstream spreading codes into two parts, spreading each symbol by one of said two parts for transmission on one of said two mutually orthogonal carrier signals, and by another one of said two parts for transmission on another one of said two mutually orthogonal carrier signals; and upon receiving a symbol from any one of said mobile stations, said base-station apparatus despreads said upstream signal by a corresponding one of said upstream spreading codes, generates an estimated symbol value of said symbol, respreads said estimated symbol value to generate an estimated interference signal, and cancels said estimated interference signal from said upstream signal so that it will not interfere with estimation of symbol values of other mobile stations.

2. The system of claim 1, wherein said mobile-station apparatus performs synchronous detection of said downstream signal.

3. The system of claim 1, wherein:

said base-station apparatus adds a control signal having a known value to said downstream signal;

said mobile-station apparatus performs asynchronous detection of said downstream signal; and said mobile-station apparatus uses said control signal to estimate a carrier phase difference, and performs a phase rotation when despreading said downstream signal, thereby compensating for said carrier phase difference.

4. The system of claim 1, wherein at least one apparatus among said base-station apparatus and said mobile-station apparatus has an adaptive differential pulse-code modulation encoder that adaptively quantizes an audio signal to be transmitted to produce a quantized difference signal, using a scale factor to prevent quantization overflow and underflow, and adjusts said scale factor responsive to said quantized difference signal, allowing said scale factor to change more rapidly when said quantized difference signal is small than when said quantized difference signal is large.

5. The system of claim 1, wherein said base-station apparatus has a shift register for storing one copy of said upstream signal, has a plurality of buffers for storing estimated signals of respective mobile stations, cancels said estimated interference signal from said upstream signal by subtracting said estimated interference signal from contents of said shift register, and adds said estimated interference signal to contents of a corresponding buffer among said buffers.

6. The system of claim 5, wherein said shift register stores a K-symbol portion of said upstream signal, K being an integer greater than unity, and each portion of said upstream signal representing one symbol of one mobile station is despread and respread K times while moving through said shift register, with cancellation of a corresponding estimated interference signal each of said K times.

7. The system of claim 1, wherein said base-station apparatus has a plurality of shift registers for storing separate copies of said upstream signal for respective mobile stations, and after generating said estimated interference signal for any one of said mobile stations, cancels said estimated interference signal from the copies of said upstream signal stored for all other mobile stations.

8. The system of claim 7, wherein each of said shift registers stores a K-symbol portion of said upstream signal, K being an integer greater than unity, and each portion of said upstream signal representing one symbol of one mobile station is despread and respread K times while moving through each of said shift registers, with cancellation of a corresponding estimated interference signal each of said K times.

9. A code-division multiple-access communication system for communication between a base station and a plurality of mobile stations, comprising a base-station apparatus at said base station and a mobile-station apparatus at each of said mobile stations, wherein: said base-station apparatus encodes a plurality of audio signals to generate symbols to be transmitted to respective mobile stations, and has a plurality of downstream spreading-code generators for generating different downstream spreading codes for different mobile stations, and dividing each downstream spreading code into a first part and a second part;

a plurality of first spreaders coupled to respective downstream spreading-code generators, for spreading the symbols to be transmitted to respective mobile stations by first parts of respective downstream spreading codes, thereby generating first baseband signals;

a plurality of second spreaders coupled to respective downstream spreading-rode generators, for spreading said symbols by second parts of respective downstream spreading codes, thereby generating second baseband signals;

a base-station downstream carrier generator for generating two mutually orthogonal carrier signals;

at least two product modulators coupled to said base-station downstream carrier generator, for modulating one of said two orthogonal carrier signals by said first baseband signals, and modulating another one of said two orthogonal carrier signals by second baseband signals;

a base-station radio transceiver coupled to said product modulators, for transmitting the two orthogonal carrier signals thus modulated to all of said mobile stations as a downstream signal, and receiving an upstream signal in which transmit signals transmitted from all of said mobile stations are combined;

a demodulator coupled to said base-station radio transceiver, for demodulating said upstream signal to obtain an upstream received baseband signal; and an interference canceler coupled to said demodulator, for recognizing symbol boundaries in said upstream signal, despreading and respreading said upstream signal to generate an estimated interference signal, and canceling said estimated interference signal from said upstream signal, the operations of despreading, respreading, and canceling being performed each time a symbol boundary is recognized; and the mobile-station apparatus at each mobile station has a transmit processor for encoding an audio input signal to generate symbol data, spreading said symbol data by an upstream spreading code, and modulating an upstream carrier signal by the symbol data thus spread, thereby obtaining a transmit signal;

a mobile-station radio-transceiver coupled to said transmit processor, for transmitting said transmit signal to said base station as part of said upstream signal, and receiving said downstream signal from said base station;

a mobile-station downstream carrier generator for generating two local carrier signals;

a pair of product demodulators coupled to said mobile-station radio transceiver and said mobile-station downstream carrier generator for demodulating said downstream signal by multiplication with said two local carrier signals, thereby obtaining two downstream received baseband signals;

a mobile-station downstream spreading-code generator for generating the downstream spreading code of said mobile station and dividing said spreading code into a first part and a second part as was done in said base-station apparatus;

a pair of correlators for correlating one of said two downstream received baseband signals with said first part of said downstream spreading code, and correlating another one of said two downstream received baseband signals with said second part of said downstream spreading code; and an adder for adding outputs of said pair of correlators.

10. The system of claim 9, wherein said two local carrier signals are synchronized in phase with the two mutually orthogonal carrier signals generated by said base-station downstream carrier generator.

11. The system of claim 9, wherein:

said two local carrier signals are not synchronized in phase with the two orthogonal carrier signals generated by said base-station downstream carrier generator;

said base-station apparatus adds a control signal with a known value to said downstream signal; and said mobile-station apparatus has a phase rotator for using said control signal to estimate a phase difference between said two local carrier signals and said two orthogonal carrier signals, and rotating said two downstream received baseband signals in phase to compensate for said phase difference.

12. The system of claim 11, wherein said phase rotator treats said two downstream received baseband signals as real and complex parts of a complex number and rotates said two downstream received baseband signals in phase by multiplying them by a complex conjugate of another complex number representing said phase difference.

13. The system of claim 11, wherein said base-station apparatus comprises:

a control spreading-code generator for generating a control spreading code, equal in chip rate to said downstream spreading codes, comprising two identical parts;

a plurality of third spreaders for spreading respective first baseband signals by one of said two identical parts;

a fourth spreader for spreading said control signal by one of said two identical parts;

a first multiplexer for additively multiplexing outputs of said third spreaders and said fourth spreader prior to modulation of said one of said two orthogonal carrier signals;

a plurality of fifth spreaders for spreading respective second baseband signals by one of said two identical parts;

a sixth spreader for spreading said control signal by one of said two identical parts; and a second multiplexer for additively multiplexing outputs of said fifth spreaders and said sixth spreader prior to modulation of said another one of said two orthogonal carrier signals.

14. The system of claim 13, wherein said phase rotator comprises:

a channel estimator for multiplying said two downstream received baseband signals, treated as real and complex parts of a first complex number, by a complex conjugate of said two identical parts of said control spreading code, treated as real and complex parts of a second complex number, and integrating resulting products over a certain number of symbol intervals, thereby generating a third complex number; and a complex multiplier for multiplying said two downstream received baseband signals, treated as real and complex parts of said first complex number, by said third complex number.

15. The system of claim 9, wherein:

at least one apparatus among said base-station apparatus and said mobile-station apparatus comprises an audio encoder for encoding an audio signal by adaptive differential pulse-code modulation, thereby generating a quantized difference signal, using a scale factor to prevent quantization overflow and underflow;

said audio encoder determines said scale factor by low-pass filtering of said quantized difference signal, with a certain passband; and said audio encoder varies said passband responsive to said quantized difference signal, so that as said quantized signal decreases in magnitude, said passband is widened and said scale factor is allowed to change more rapidly.

16. The system of claim 15, wherein said audio encoder comprises:

a weighting converter for transforming said quantized difference signal according to a fixed function to generate a first value;

a logarithmic scale-factor calculator for multiplying said first value by a parameter δ to obtain a second value, multiplying a logarithm of a current value of said scale factor by (1−δ) to obtain a third value, and adding said second value to said third value, thus obtaining a logarithm of a next value of said scale factor; and a parameter adapter for determining said parameter 6 as a monotonic decreasing function of said logarithm of a current value of said scale factor.

17. The system of claim 9, wherein said interference canceler comprises:

a shift register for receiving, storing, and shifting said upstream received baseband signal;

at least one interference processor for reading a one-symbol portion of said shift register, processing said one-symbol portion to generate said estimated interference signal, and modifying said one-symbol portion of said shift register by subtracting said estimated interference signal, responsive to recognition of a symbol boundary of said mobile station; and a plurality of buffers, corresponding to said mobile stations, for storing estimated interference signals generated by said interference processor when symbol boundaries of corresponding mobile stations are recognized.

18. The system of claim 17, wherein said interference processor comprises:

a symbol estimator for correlating said one-symbol portion with the upstream spreading code of a corresponding mobile station, thereby despreading said one-symbol portion, to generate an estimated symbol value;

an interference estimator for respreading said estimated symbol value by multiplication with said upstream spreading code to generate said estimated interference signal; and a subtractor for subtracting said estimated interference signal from said one-symbol portion of said shift register.

19. The system of claim 17, wherein said shift register is divided into K stages coupled in series, K being an integer greater than one, each of said stages holding a one-symbol portion of said upstream received baseband signal.

20. The system of claim 19 wherein, whenever a symbol boundary of any mobile station is recognized, the one-symbol portion of said upstream received baseband signal held in each of said K stages is processed as described in claim 17, resulting, as said upstream received baseband signal is shifted through said shift register, in K estimated interference signals per symbol.

21. The system of claim 20, wherein each buffer in said plurality of buffers comprises at least one buffer adder, for adding said K estimated interference signals.

22. The system of claim 9, wherein said interference canceler comprises:

a plurality of shift registers corresponding to different mobile stations, for storing and shifting separate copies of said upstream received baseband signal;

a controller for recognizing said symbol boundaries;

an upstream spreading-code generator for generating the upstream spreading code of a mobile station, responsive to recognition of a symbol boundary of that mobile station by said controller;

a correlator for correlating said upstream spreading code with contents of a corresponding one shift register among said plurality of shift registers to generate a correlation value;

an estimator for generating an estimated symbol value from said correlation value;

a respreader for respreading said estimated symbol value by multiplication with said upstream spreading code to generate said estimated interference signal; and a canceler for subtracting said estimated interference signal from the shift registers other than said corresponding one shift register in said plurality of shift registers.

23. The system of claim 22, wherein each shift register in said plurality of shift registers holds a K-symbol portion of said upstream received baseband signal.

24. The system of claim 22, wherein said estimator generates said estimated symbol value by multiplying a square root of art absolute value of said correlation value by a sign of said correlation value.

25. The system of claim 22, wherein said estimator generates said estimated symbol value by limiting said correlation value in absolute value.

26. The system of claim 25, wherein said estimator also multiplies said correlation value by a constant.

27. A method of communication between a base station and a plurality of mobile stations, employing a single downstream channel for transmission from said base station to all of said mobile stations and a single upstream channel for transmission from all of said mobile stations to said base station, comprising the steps of:

(a) assigning a different upstream spreading code to each mobile station among said plurality of mobile stations;

(b) assigning a different downstream spreading code to each mobile station among said plurality of mobile stations;

(c) dividing the downstream spreading code assigned to each mobile station into two parts;

(d) at said base station, spreading data comprising symbols to be transmitted to each mobile station by both of said parts of the downstream spreading code assigned to that mobile station, thereby generating, for each mobile station, a first downstream baseband signal and a second downstream baseband signal derived from identical data;

(e) modulating a first carrier signal by the first downstream baseband signal of each mobile station;

(f) modulating a second carrier signal by the second downstream baseband signal of each mobile station;

(g) combining said first carrier signal and said second carrier signal to create a downstream signal;

(h) transmitting said downstream signal to all of said mobile stations;

(i) in each individual mobile station, receiving and demodulating said downstream signal by two locally generated carrier signals to generate two received baseband signals;

(j) despreading said two received baseband signals by respective parts of the downstream spreading code assigned to said individual mobile station, thereby obtaining pairs of correlated values;

(k) additively combining respective pairs of correlated values;

(l) spreading data comprising symbols to be transmitted from each mobile station to said base station by the upstream spreading code assigned to said mobile station;

(m) transmitting the data thus spread from said mobile station to said base station, by modulation of an upstream carrier signal;

(n) receiving at said base station an upstream signal in which modulated upstream carrier signals transmitted from all of said mobile stations in said step (m) are additively combined;

(o) demodulating said upstream signal to obtain an upstream received baseband signal;

(p) storing at least one copy of said upstream received baseband signal in a shift register;

(q) as soon as reception of a symbol from any one mobile station is completed, despreading said upstream received baseband signal by correlation with the upstream spreading code assigned to said one mobile station, thereby deriving an estimated symbol value;

(r) respreading said estimated symbol value by said upstream spreading code, thereby obtaining an estimated interference signal; and (s) subtracting said estimated interference signal from at least one stored copy of said upstream received baseband signal, so that said estimated interference signal will be excluded when estimated symbol values of mobile stations other than said one mobile station are derived in subsequent repetitions of said step (q).

28. The method of claim 27, wherein all downstream spreading codes assigned in said step (b) are mutually orthogonal.

29. The method of claim 27, wherein said two locally generated carrier signals are synchronized in phase with said first carrier signal and said second carrier signal.

30. The method of claim 27, wherein said two locally generated carrier signals are not synchronized in phase with said first carrier signal and said second carrier signal, comprising the further steps of:

inserting a control signal of known value in said downstream signal;

using said control signal to estimate a phase difference between the two locally generated carrier signals and said first carrier signal and said second carrier signal; and performing an affine transformation on said two received baseband signals to compensate for said phase difference, prior to despreading in said step (j).

31. The method of claim 27, wherein said two locally generated carrier signals are not synchronized in phase with said first carrier signal and said second carrier signal, comprising the further steps of:

generating a control signal having a known value at said base station;

generating a control spreading code having a chip rate identical to the downstream spreading code of each mobile station;

dividing said control spreading code into two identical parts;

spreading said control signal by said two identical parts of said control spreading code, thereby generating a first spread control signal and an identical second spread control signal;

spreading the first downstream baseband signal and second downstream baseband signal of each mobile station by respective parts of said control spreading code, prior to modulation of said first carrier signal and said second carrier signal;

also modulating said first carrier signal by said first spread control signal, and said second carrier signal by said second spread control signal;

at each mobile station, multiplying said two received baseband signals, treated as real and complex parts of a first complex number, by a complex conjugate of a second complex number having said two identical parts of said control spreading code as real and complex parts, to obtain a complex product;

integrating said complex product over a certain length of time to obtain a third complex number; and multiplying said two received baseband signals, treated as said first complex number, by said third complex number, prior to despreading in said step (j).

32. The method of claim 27, comprising the further steps of:

encoding an audio signal by adaptive differential pulse-code modulation for transmission on at least one channel among said said upstream channel and said downstream channel, thereby generating a quantized difference signal;

using a scale factor to prevent quantization overflow and underflow in the encoding of said audio signal;

determining said scale factor by low-pass filtering of said quantized difference signal, with a certain passband; and varying said passband responsive to said quantized difference signal, so that as said quantized difference signal decreases in magnitude, said passband is widened and said scale factor is allowed to change more rapidly.

33. The method of claim 32, wherein determining said scale factor and varying said passband collectively comprise:

transforming said quantized signal according to a fixed mathematical function to generate a first value;

multiplying said first value by a parameter $\delta$ and adding thereto a logarithm of a current value of said scale factor, said logarithm first being multiplied by $(1-\delta)$, thus obtaining a logarithm of a next value of said scale factor; and determining said parameter 8 as a certain monotonic decreasing function of said logarithm of a current value of said scale factor.

34. The method of claim 27, wherein:

a K-symbol portion of said upstream received baseband signal is stored in said shift register, K being an integer greater than one;

K estimated symbol values are derived in said step (q); and said K estimated symbol values are respread in said step (r) to obtain said estimated interference signal.

35. The method of claim 34, comprising the further steps of:

providing a separate buffer for each mobile station;

storing a one-symbol portion of said estimated interference signal in the buffer thus provided for said one mobile station; and adding other portions of said estimated interference signal to existing contents of said buffer.

36. The method of claim 34 wherein, in said step (p), for each said mobile station, a Separate copy of said upstream received baseband signal is stored in a separate shift register.

37. The method of claim 36, wherein:

said step (q) comprises spreading the copy of said upstream received baseband signal stored for said one mobile station; and said step (s) comprises subtracting said estimated interference signal from copies of said upstream received baseband signal stored for all of said other mobile stations.

38. The method of claim 27, wherein said step (q) comprises:

obtaining a correlation value by correlation with said upstream spreading code; and multiplying a square root of an absolute value of said correlation value by a sign of said correlation value.

39. The method of claim 27, wherein said step (q) comprises:

obtaining a correlation value by correlation with said upstream spreading code; and limiting said correlation value in absolute value.

40. The method of claim 39, wherein said step (q) also comprises multiplying said correlation value by a constant.

* * * * *